US012621321B2

(12) United States Patent
Chesla et al.

(10) Patent No.: US 12,621,321 B2
(45) Date of Patent: May 5, 2026

(54) AUTOMATIC GENERATION OF CAUSE AND EFFECT ATTACK PREDICTIONS MODELS VIA THREAT INTELLIGENCE DATA

(71) Applicant: Cybereason Inc., Boston, MA (US)

(72) Inventors: Avi Chesla, Tel Aviv (IL); Sergei Edelstein, Herzelia (IL)

(73) Assignee: Cybereason Inc., Boston, MA (US)

( * ) Notice: Subject to any disclaimer, the term of this patent is extended or adjusted under 35 U.S.C. 154(b) by 405 days.

(21) Appl. No.: 18/194,263

(22) Filed: Mar. 31, 2023

(65) Prior Publication Data

US 2023/0319089 A1 Oct. 5, 2023

Related U.S. Application Data

(60) Provisional application No. 63/362,286, filed on Mar. 31, 2022.

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01)

(58) Field of Classification Search
CPC .............................. H04L 63/1425; H04L 41/16
See application file for complete search history.

(56) References Cited

U.S. PATENT DOCUMENTS

| | | | |
|---|---|---|---|
| 7,933,989 B1 | 4/2011 | Barker et al. | |
| 8,150,783 B2 | 4/2012 | Gonsalves et al. | |
| 8,572,750 B2 | 10/2013 | Patel et al. | |
| 8,800,045 B2 | 8/2014 | Curtis et al. | |
| 9,680,846 B2 | 6/2017 | Haugsnes | |
| 9,716,721 B2 * | 7/2017 | Hovor ................. | H04L 63/1416 |
| 9,747,446 B1 | 8/2017 | Pidathala et al. | |
| 10,650,150 B1 * | 5/2020 | Rajasooriya ............. | G06N 7/01 |
| 10,659,488 B1 * | 5/2020 | Rajasooriya ........ | H04L 63/1433 |
| 10,673,903 B2 | 6/2020 | Chesla et al. | |
| 10,848,515 B1 * | 11/2020 | Pokhrel .............. | H04L 63/1433 |
| 11,228,610 B2 | 1/2022 | Medalion et al. | |

(Continued)

OTHER PUBLICATIONS

Yang, et al., "Optimized very fast decision tree with balanced classification accuracy and compact tree size," The 3rd international conference on data mining and intelligent information technology applications, IEEE, 2011, pp. 57-64.

(Continued)

*Primary Examiner* — Patrice L Winder

(74) *Attorney, Agent, or Firm* — Banner & Witcoff, Ltd.

(57) ABSTRACT

A method for predicting a future stage of an attack on a computer system. The method comprises performing, by the computer system, linguistic analysis on threat intelligence reports, where the threat intelligence reports comprise known stages of the attack. The method also comprises processing, by the computer system, the linguistic analysis with a transition matrix to determine probabilities of cause-and-effect relationships between the known stages of the attack, updating, by the computer system, a probability model based on the probabilities determined by the transition matrix, and predicting, by the computer system, the future stage of the attack based on the probability model and attack classifications.

20 Claims, 23 Drawing Sheets

(56) References Cited

U.S. PATENT DOCUMENTS

| | | | |
|---|---|---|---|
| 2003/0217033 | A1 | 11/2003 | Sandler et al. |
| 2004/0114519 | A1 | 6/2004 | MacIsaac |
| 2004/0143756 | A1 | 7/2004 | Manson et al. |
| 2005/0049990 | A1 | 3/2005 | Milenova et al. |
| 2012/0096549 | A1 | 4/2012 | Amini et al. |
| 2012/0263376 | A1 | 10/2012 | Wang et al. |
| 2012/0304007 | A1 | 11/2012 | Hanks et al. |
| 2013/0097706 | A1 | 4/2013 | Titonis et al. |
| 2013/0198840 | A1 | 8/2013 | Drissi et al. |
| 2013/0276122 | A1 | 10/2013 | Sowder |
| 2014/0201836 | A1* | 7/2014 | Amsler ................... H04L 63/20 726/23 |
| 2014/0208426 | A1 | 7/2014 | Natarajan et al. |
| 2014/0215618 | A1 | 7/2014 | Amit |
| 2014/0280166 | A1 | 9/2014 | Bryars et al. |
| 2014/0283026 | A1 | 9/2014 | Amit et al. |
| 2014/0283050 | A1 | 9/2014 | Amit |
| 2014/0337974 | A1 | 11/2014 | Joshi et al. |
| 2016/0212166 | A1 | 7/2016 | Henry et al. |
| 2016/0212167 | A1 | 7/2016 | Dotan et al. |
| 2016/0335435 | A1 | 11/2016 | Schmidter et al. |
| 2017/0018075 | A1 | 1/2017 | Middlebrooks et al. |
| 2017/0091673 | A1 | 3/2017 | Gupta et al. |
| 2017/0116544 | A1 | 4/2017 | Johnson et al. |
| 2018/0027006 | A1 | 1/2018 | Zimmermann et al. |
| 2021/0367961 | A1* | 11/2021 | Kuppa .................. G06F 40/205 |
| 2022/0131887 | A1* | 4/2022 | Ngweta ............... H04L 63/1433 |
| 2023/0038196 | A1* | 2/2023 | Labreche .............. G06F 21/577 |
| 2023/0224324 | A1* | 7/2023 | Karabey ............. H04L 63/1416 726/23 |
| 2023/0252158 | A1* | 8/2023 | Bishop, III ............. G06F 40/30 726/25 |

OTHER PUBLICATIONS

The International Search Report and the Written Opinion of the International Searching Authority for PCT/US2015/039664, ISA/RU, Moscow, Russia, Oct. 15, 2015.

The International Search Report and the Written Opinion of the International Searching Authority for PCT/US2015/060109, ISA/RU, Moscow, Russia, Mar. 10, 2016.

Devlin, et al., "Bert: Pre-training of deep bidirectional transformers for language understanding," arXiv preprint arXiv:1810.04805, 2018, 16 pages.

Eberts, et al.,. "Span-based joint entity and relation extraction with transformer pre-training," arXiv preprint arXiv:1909.07755, 2019, 8 pages.

Soares, et al., "Matching the blanks: Distributional similarity for relation learning," arXiv preprint arXiv:1906.03158 2019, 10 pages.

He, et al., "Deberta: Decoding-enhanced bert with disentangled attention," arXiv preprint arXiv:2006.03654, 2020, 23 pages.

Wang, et al., "Must-read papers on pretrained language models (plms)," GitHib, Inc., https://github.com/thunlp/PLMpapers, Jun. 16, 2021.

* cited by examiner

200

Table-1: Transition types

| Relation ID | Description | Transition (from to) | Order sensitivity |
|---|---|---|---|
| 1 | | Example of | Directed |
| 2 | | | Directed |
| 3 | | In same list | Undirected |

FIGURE 2A

Table-2: Section qualification

210

| Txt ID | Entity mark | Entity ID | Comment | Notes |
|---|---|---|---|---|
| 12345678 | e1 | 020100 | Active Scanning | |
| 12345678 | e2 | 020000 | Reconnaissance | Not important |
| 12345678 | e3 | 020102 | Search Open Websites/Domains | |
| 12345678 | e4 | 020103 | Search Open Technical Databases | |
| 12345678 | e5 | 030100 | Resource Development | |
| 12345678 | e6 | 030111 | Develop Capabilities | |
| 12345678 | e7 | 020211 | Obtain Capabilities | |
| 12345678 | e8 | 010000 | Initial Access | May be ignored |
| 12345678 | e9 | 040501 | External Remote Services | |
| 12345678 | e10 | 020200 | Exploit Public-Facing Application | |

Table-3: Direct transition qualification

| Txt_ID | Entity mark 1 | Entity mark 2 | Relation id | Comment | Notes |
|---|---|---|---|---|---|
| 12345678 | e1 | e2 | 1 | Transition | To Markov chain |
| 12345678 | e1 | e3 | 1 | Transition | |
| 12345678 | e1 | e4 | 1 | Transition | |
| 12345678 | e1 | e5 | 1 | Transition | To Markov chain |
| 12345678 | e1 | e6 | 1 | Transition | |
| 12345678 | e1 | e7 | 1 | Transition | |
| 12345678 | e1 | e8 | 1 | Transition | To Markov chain |
| 12345678 | e1 | e9 | 1 | Transition | |
| 12345678 | e1 | e10 | 1 | Transition | |
| 12345678 | e2 | e3 | 2 | Example | |
| 12345678 | e2 | e4 | 2 | Example | |
| 12345678 | e5 | e6 | 2 | Example | |

FIGURE 2C

Table-4: Un-direct transition qualification

230

| Txt_ID | Entity mark 1 | Entity mark 2 | Relation id | Comment | Notes |
|---|---|---|---|---|---|
| 12345678 | e2 | e5 | 3 | Same list | |
| 12345678 | e5 | e2 | 3 | Same list | |
| 12345678 | e2 | e8 | 3 | Same list | |
| 12345678 | e8 | e2 | 3 | Same list | |
| 12345678 | e5 | e8 | 3 | Same list | |
| 12345678 | e8 | e5 | 3 | Same list | |
| 12345678 | e3 | e4 | 3 | Same list | |
| 12345678 | e4 | e3 | 3 | Same list | |
| 12345678 | e6 | e7 | 3 | Same list | |
| 12345678 | e7 | e6 | 3 | Same list | |
| 12345678 | e9 | e10 | 3 | Same list | |
| 12345678 | e10 | e9 | 3 | Same list | |

| FROM / TO | 1 | 2 | 3 | 4 | 5 | 6 | 7 | 8 | 9 | : |
|---|---|---|---|---|---|---|---|---|---|---|
| 1 | 0 | : | : | : | : | 3 | : | : | 0 | : |
| 2 | 1 | 0 | 0 | 1 | 0 | 1 | 1 | : | : | : |
| 3 | 1 | 1 | 1 | 0 | 2 | 1 | 2 | : | : | : |
| 4 | 1 | : | 1 | 1 | 0 | 1 | 2 | : | : | : |
| 5 | 1 | 2 | 1 | 2 | 0 | 3 | 1 | : | : | : |
| 6 | 3 | 0 | 1 | 2 | 3 | 0 | 1 | 3 | : | : |
| 7 | 1 | : | : | 2 | 2 | 2 | 0 | 0 | : | : |
| 8 | 1 | : | : | : | : | : | 3 | : | : | : |
| 9 | : | : | : | : | : | : | : | : | 0 | : |
| : | : | : | : | : | : | : | : | : | : | 0 |

Threat Intelligence Text

304

Parsing and ideniification of entities

306

Markup the entities

308

Define a test section for analysis per pair

310

Section processing via ML

312

Pair relationship output

400

402

404

| From \ To | ... | 020101 | 030202 | 030203 | 040100 | 050301 | 050401 | ... | ... | ... |
|---|---|---|---|---|---|---|---|---|---|---|
| ... | | | | | | | | | | |
| 020101 | | 0 | 0.06 | 0.02 | 0 | 0.95 | 0.65 | | | |
| 030202 | | 0.49 | 0 | 0.05 | 0.01 | 0.01 | 0.13 | | | |
| 030203 | | 0.21 | 0.55 | 0 | 0 | 0.90 | 0.85 | | | |
| 040100 | | 0.13 | 0.5 | 0.3 | 0 | 0.4 | 0.99 | | | |
| 050301 | | 0.15 | 0.45 | 0.3 | 0.8 | 0 | 0.1 | | | |
| 050401 | | 0 | 0.1 | 0.2 | 0.93 | 0.91 | 0 | | | |
| ... | | | | | | | | | | |
| ... | | | | | | | | | | |
| ... | | | | | | | | | | |
| ... | | | | | | | | | | |

Figure 5:
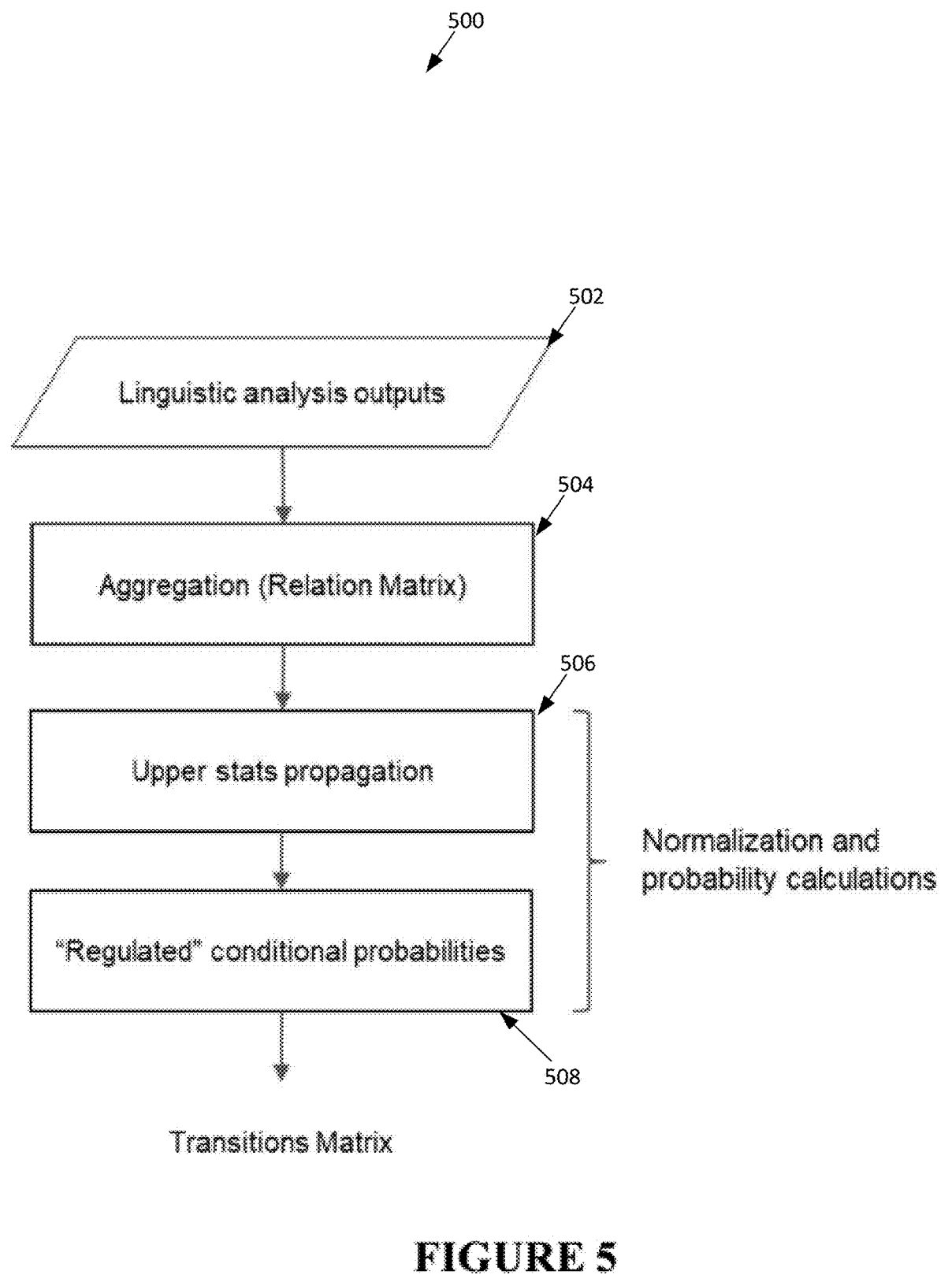

Linguistic analysis outputs

504

Aggregation (Relation Matrix)

506

Upper stats propagation

Normalization and
probability calculations

"Regulated" conditional probabilities

508

Transitions Matrix

| eFROM \ eTO | 1 | 2 | 3 | 4 | 5 | : |
|---|---|---|---|---|---|---|
| 1 | 0 | 1 | 0 | 1 | 0 | : |
| 2 | 1 | MAX(1,4)=4 | 1 | 1 | 2 | : |
| 3 | 1 | 1 | 0 | 1 | 0 | : |
| 4 | 1 | 1 | 1 | 0 | 1 | : |
| 5 | 1 | 2 | 1 | 2 | 3 | : |
| 6 | 1 | 0 | 1 | 2 | 2 | : |
| 7 | 2 | : | : | : | : | : |
| 8 | 1 | : | : | : | : | : |
| 9 | 1 | : | : | : | : | : |
| : | : | : | : | : | 0 | : |

Row 2 = Technique-only "A"

Row 5 = Sub technique of "A"
Row 6 = Sub technique of "A"
Row 7 = Sub technique of "A"

Transition Matrix

1104

Apply matrix decompostion methods

1106

Decompostion qaulity score

1108

Select best decomposition matrix

1110

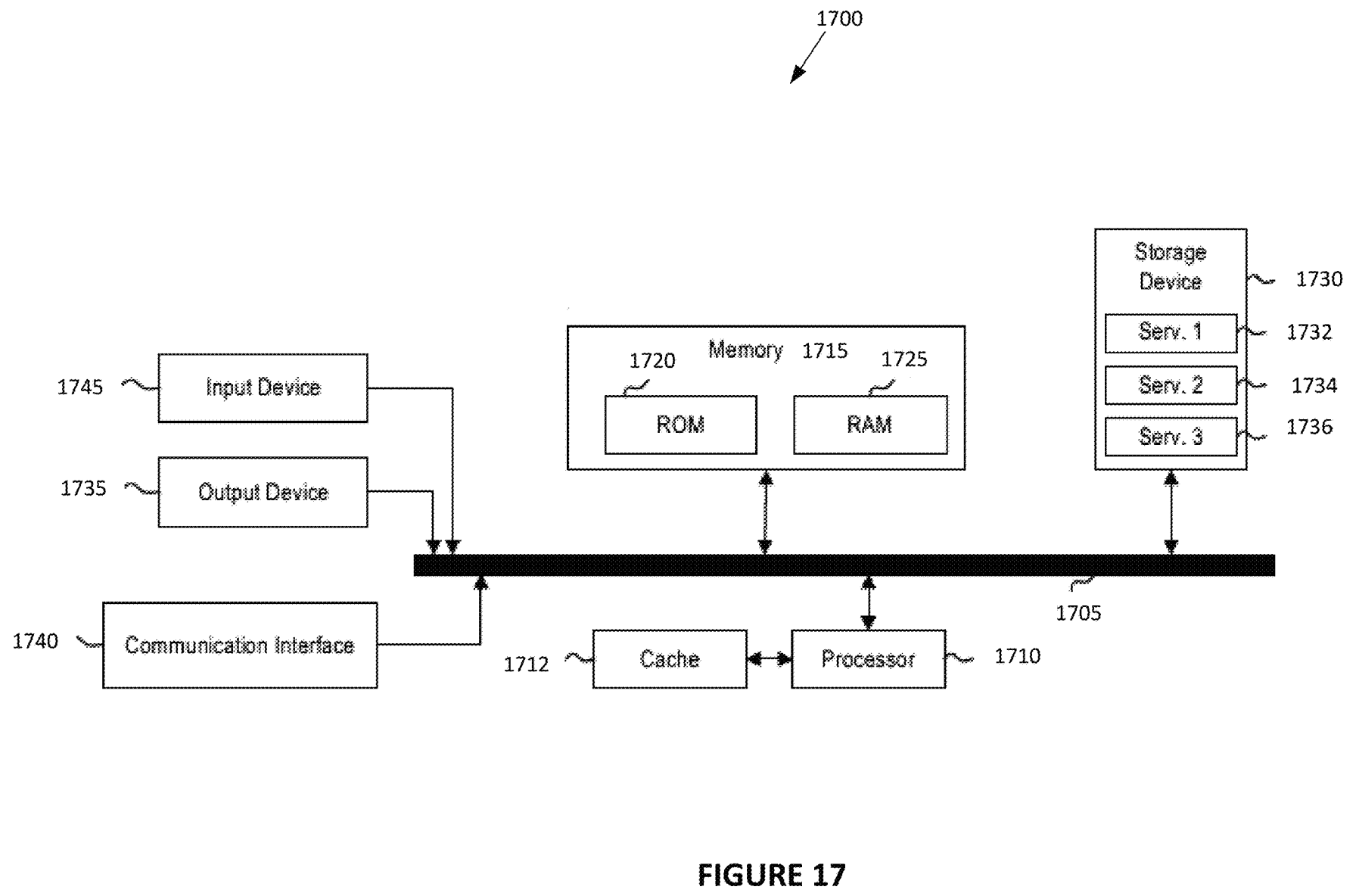

Generate BBN influence diagram 1730
1732
1734
1736

Storage Device

Serv. 1
Serv. 2
Serv. 3

1705

Memory 1715

1725

RAM

1720

ROM

1710

Processor

1712

Cache

1700

1745

Input Device

1735

Output Device

1740

Communication Interface

FIGURE 17

AUTOMATIC GENERATION OF CAUSE AND EFFECT ATTACK PREDICTIONS MODELS VIA THREAT INTELLIGENCE DATA

CROSS-REFERENCE TO RELATED APPLICATION

The present application claims priority of U.S. Provisional Patent Application 63/362,286 filed on Mar. 31, 2022, the entire contents of which is incorporated herein for all purposes by this reference. The present application is related to U.S. Pat. No. 11,228,610, issued Jan. 18, 2022, and U.S. Pat. No. 10,673,903, issued Jun. 2, 2020, the entire contents of which are hereby incorporated herein for all purposes by this reference.

FIELD

Embodiments disclosed herein generally relate to a system automatic generation of cause-and-effect attack predictions models via threat intelligence data.

BACKGROUND

Frequency and sophistication of cyberattacks are on the rise. As a result, the time it takes organizations to detect, investigate, respond and contain attacks is unacceptable. This makes organizations vulnerable to threats such as data theft and data manipulation, identity theft, ransomware and more.

One reason it takes too long to detect, investigate, respond and contain attacks, is because existing security solutions are designed to detect and respond to attacks based on current and historical evidence and alerts, without the capability to predict the attacker's next steps and prevent them. Therefore, these conventional solutions fail to provide a proactive way to deal with attacks.

SUMMARY

In some embodiments a method is implemented for predicting a future stage of an attack on a computer system. The method comprises performing, by the computer system, linguistic analysis on threat intelligence reports, where the threat intelligence reports comprise known stages of the attack. The method also comprises processing, by the computer system, the linguistic analysis with a transition matrix to determine probabilities of cause-and-effect relationships between the known stages of the attack, updating, by the computer system, a probability model based on the probabilities determined by the transition matrix, and predicting, by the computer system, the future stage of the attack based on the probability model and attack classifications.

BRIEF DESCRIPTION OF DRAWINGS

So that the manner in which the above recited features of the present disclosure may be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A depicts a table of transition types, according to example embodiments of the present disclosure.

FIG. 2B depicts a table of section qualification, according to example embodiments of the present disclosure.

FIG. 2C depicts a table of direct transition qualification, according to example embodiments of the present disclosure.

FIG. 2D depicts a table of un-direct transition qualification, according to example embodiments of the present disclosure.

FIG. 2E depicts a relations matrix, according to example embodiments of the present disclosure.

FIG. 4 depicts a transition matrix, according to example embodiments of the present disclosure.

FIG. 5 depicts a process for transition matrix generation, according to example embodiments of the present disclosure.

FIG. 6A depicts an upper propagation matrix, according to example embodiments of the present disclosure.

FIG. 17 depicts an architecture of system bus computing system of one or more of the computer devices shown in FIG. 1A, according to example embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

A challenge to conventional systems is that there is no viable solution that allows organizations to predict future attack steps and develop actions that would prevent these attacks. Therefore, conventional systems are not able to analyze the root-cause steps that led to a current stage of the attack, so that security analysts may accelerate their investigation process to reveal evidence that validates these steps thereby validating the true level of compromise within the network. Therefore, security analysts are not able to act quickly enough to remediate attacks.

The present disclosure proposes solutions that address the deficiencies described above by way of prediction models and Artificial Intelligence (AI) powered decision making solutions. One of the challenges in creating prediction models may be to create a large data set that represents an influence between attack states (where each state represents a potential attack step/stage). This may come in the form of an influence diagram model, or other models which are further described in this disclosure. Another challenge may be to provide AI powered decision-making solutions that are descriptive in a way that allow cyber security experts, that are typically not domain experts in the field of AI, to understand the prediction's decision-making process, and to be able to easily validate and provide feedback accordingly.

One or more techniques described herein address the limitations in the current state of the art by providing a system and method that utilizes cyber threat prediction methods to significantly reduce the time to accurately detect, investigate and respond to cyber-attacks. For example, the present system may utilize one or more mechanisms to reveal hidden evidence that are part of an existing cyber-attack as well as to predict the evolution of an existing attack (typically an early-stage attack).

In one example, the disclosure deals with methods that automatically create a prediction model based on external threat intelligence sources. In addition, the disclosure produces descriptive predictions output in a natural language (e.g., MITRE ATT&CK®) that is well known to cyber security experts and thus allows these experts to quickly evaluate the accuracy of cyber predictions.

Figure 1A:
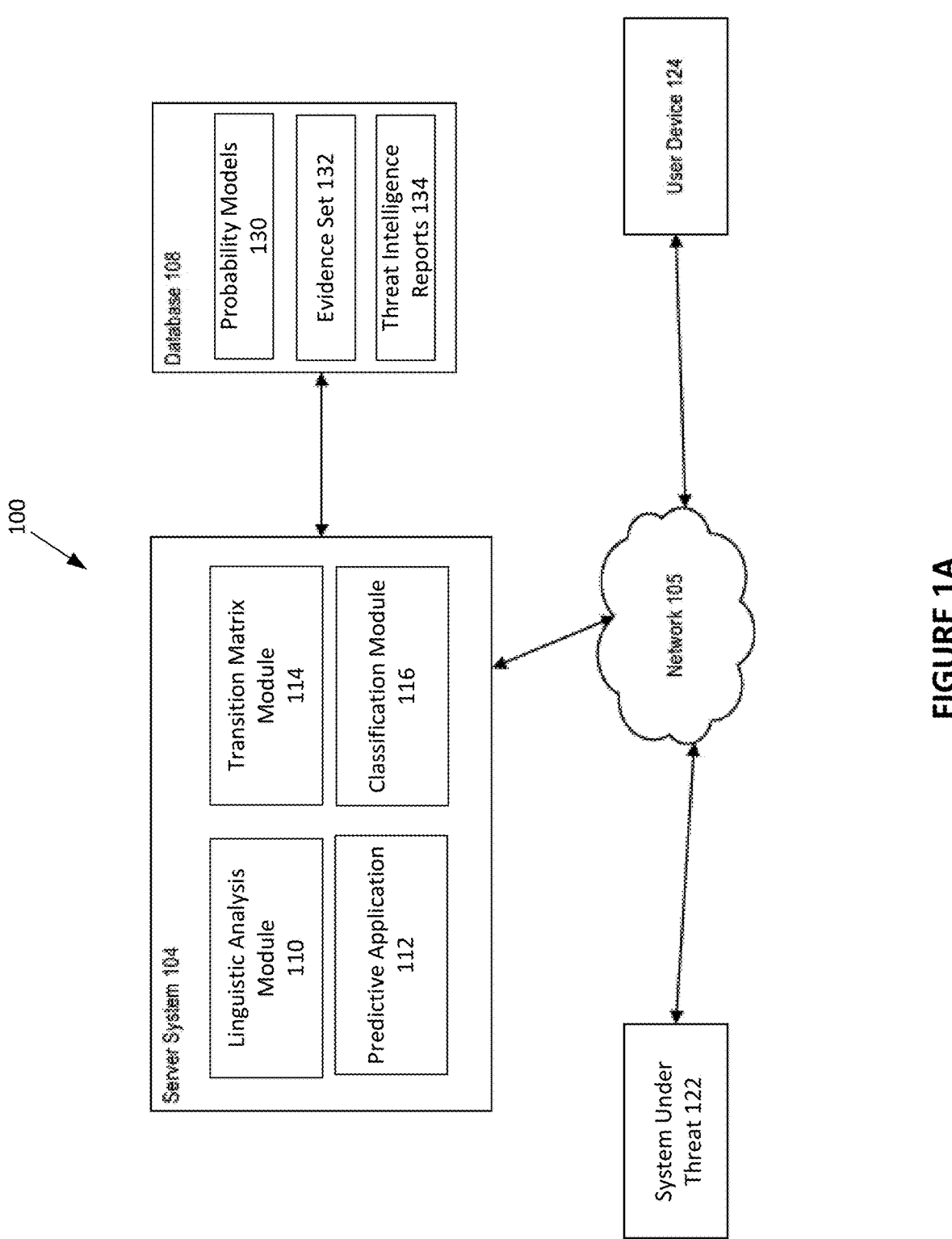
FIG. 1A depicts a block diagram of a computing environment, according to example embodiments of the present disclosure.

FIG. 1A depicts a block diagram of a computing environment 100, according to example embodiments of the present disclosure. Computing environment 100 may include server system 104, database 108, system under threat 122 and user device 124, which may be communicably coupled via a network 105.

In some embodiments, system under threat 122 and/or user device 124 may include one or more computing devices capable of receiving user input, transmitting and/or receiving data via the network 105, and or communicating with server system 104. In some embodiments, system under threat 122 and/or user device 124 may be representative of a computer system, such as a desktop or laptop computer. In some embodiments, system under threat 122 and/or user device 124 may be a device having computer functionality, such as a personal digital assistant (PDA), a mobile telephone, a smartphone, or other suitable device.

Network 105 may include one or more wide areas networks (WANs), metropolitan area networks (MANs), local area networks (LANs), personal area networks (PANs), or any combination of these networks. Network 105 may include a combination of one or more types of networks, such as Internet, intranet, Ethernet, twisted-pair, coaxial cable, fiber optic, cellular, satellite, IEEE 801.11, terrestrial, and/or other types of wired or wireless networks. Network 105 may also use standard communication technologies and/or protocols.

Server system 104 may include any combination of one or more of web servers, mainframe computers, general-purpose computers, personal computers, or other types of computing devices. Server system 104 may represent distributed servers that may be remotely located and communicate over a communications network, or over a dedicated network such as a local area network (LAN). Server system 104 may also include one or more back-end servers for carrying out one or more aspects of the present disclosure. In some embodiments, server system 104 may include a primary server and multiple nested secondary servers for additional deployments of server system 104. This may enable greater scalability and deployability, as well as the ability to deploy asset-based severity scoring systems at a specific premises if requested by a user.

As shown in FIG. 1A, server system 104 may include linguistic analysis module 110, predictive application 112, transition matrix module 114 and classification module 116. Each of linguistic analysis module 110, predictive application 112, transition matrix module 114 and classification module 116 may be configured as one or more software modules which may be collections of code or instructions stored on a media (e.g., memory of server system 104) that represent a series of machine instructions (e.g., program code) that implements one or more algorithmic steps. Such machine instructions may be the actual computer code the processor of server system 104 interprets to implement the instructions or, alternatively, may be a higher level of coding of the instructions that may be interpreted to obtain the actual computer code. The one or more software modules may also include one or more hardware components. One or more aspects of an example algorithm may be performed by the hardware components (e.g., circuitry) itself, rather than as a result of the instructions.

In some embodiments, linguistic analysis module 110 may be configured to perform linguistic analysis on threat intelligence reports that may include information relevant to known stages of an attack. In some embodiments, transition matrix module 114 may be configured to determine probabilities of cause-and-effect relationships between attack states (entities). In some embodiments, classification module 116 may be configured to classify an evidence data set into recognized attack states. In some embodiments, predictive application 112 may be configured to predict a future stage in an attack for a system under threat 122 based on the output of probability models and the classification of evidence set. As shown, server system 104 may be in communication with database 108. Database 108 may include probability models 130, evidence set 132 and threat intelligence reports 134.

Figure 1B:
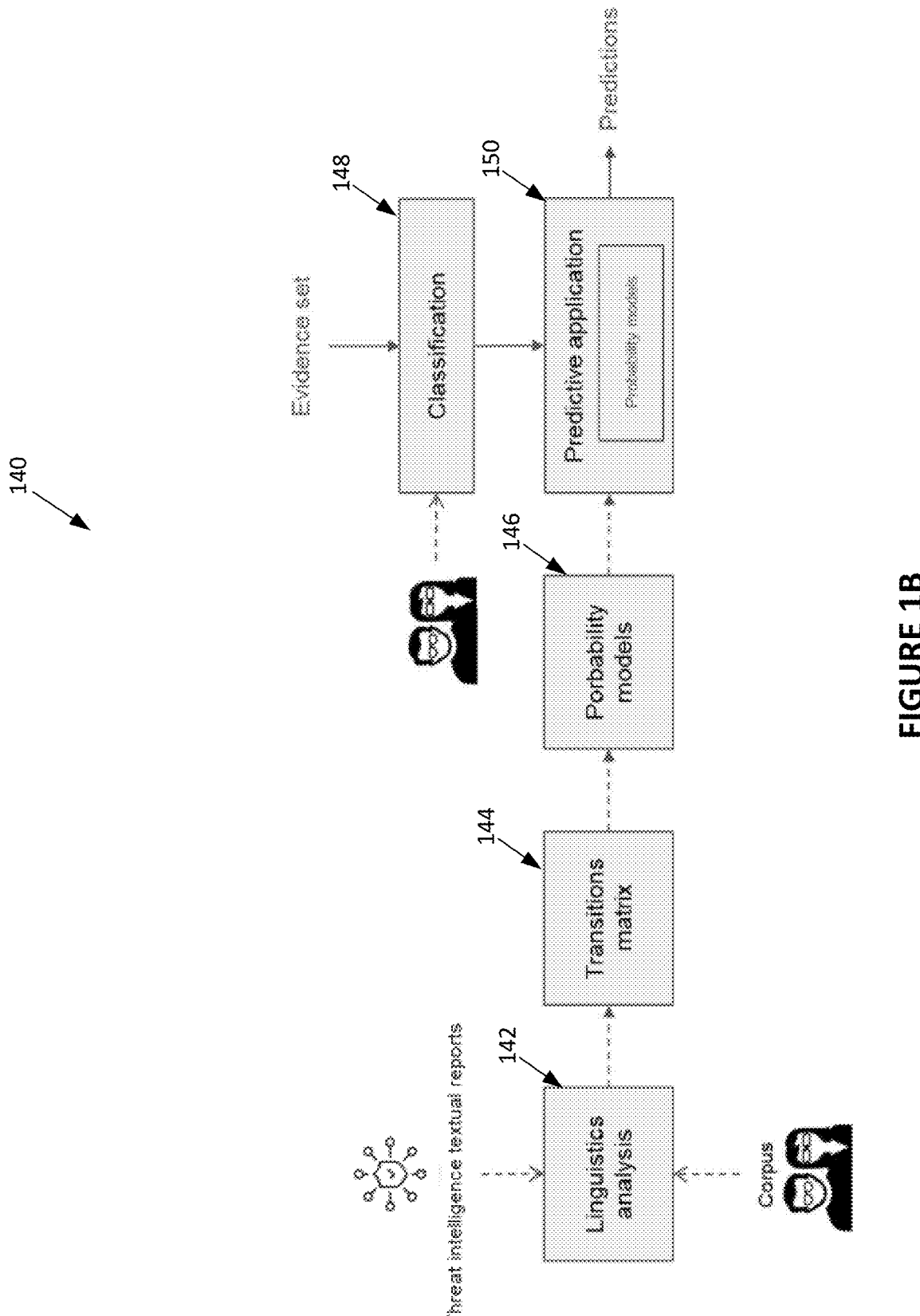
FIG. 1B depicts a flowchart of attack prediction, according to example embodiments of the present disclosure.

FIG. 1B depicts a flowchart 140 of attack prediction, according to example embodiments of the present disclosure. In step 142, linguistic analysis module 110 of server system 104 may perform a linguistic analysis on threat intelligence reports 134 of database 108 and other information received from the corpus of data for a possible threat detected on system under threat 122. The linguistic analysis may then be processed by transition matrix module 114 in step 144 to determine the probabilities of cause-and-effect relationships between attack states (entities). Probability model(s) 130 may be generated and updated in step 146 based on the transition matrix module 114 output. These probability models 130 may then be used by predictive application 112 of server system 104 in step 150 along with classifications received from classification module 116 of server system 104 in step 148 to predict attacks. In some embodiments, the classifications may be based on an evidence set that includes, for example, logs that may be collected from at least one of security tools, network devices, identity management systems, cloud workspace applications, endpoint operating system (OS) and others. Collected logs may be classified into recognized attack states (entities) which may serve as the input entities vector for the prediction models. The communications described above generally occur through network 105.

In some embodiments, linguistic analysis step 142 may include an initial pre-trained natural language processing (NLP) model with the capability of predicting missing textual terms. There may be a few state-of-the-art machine learning (ML) techniques such as Bidirectional Encoder Representations from Transformers (BERT) that may be used for creating NLP predictive models based on textual data in an unsupervised manner.

Threat intelligence threat reports may be retrieved in step 142, manually or automatically. These reports may be retrieved from both open as well as commercial data sources such as Virus Total®, MS threat Center®, SANS Internet Storm Center®, FBI InfraGard®, MITRE ATT&CK®, emails, internal communications, previous cases in which the system was run and analysts interacted with the system, and others. The BERT pre-trained model may analyze the threat reports and predict a set of threats cause and effect sequences. An example of a report and possible predictions derived from the text may be given as the following threat report:

"Adversaries may modify access tokens to operate under a different user or system security context to perform actions and bypass access controls . . . . An adversary can use built-in Windows application programming interface (API) functions to copy access tokens from existing processes that may be known as token stealing. These token can then be applied to an existing process (i.e. token impersonation/ theft) or used to spawn a new process (i.e. create a process with the token)."

Predictions and conclusions that may be derived from the above example text may include token stealing followed by two possible attack steps (e.g. token impersonation/theft or spawn a new process). The prediction may result in sequences of attack states that may be beneficial for establishing a successful attack scenario. In one example, a prediction model goal may be to produce following attack sequences: After "Action 1", attacker may apply "Action 2" and "Action 3"; "Action 5" may usually be followed by "Action 4"; "Action 6" may usually be accompanied by "Action 7" and "Action 8"; in order to execute "Action 9" the adversary may have already gained sufficient permissions by performing "Action 8" or "Action 9". An "action" in this case may represent an attack state.

One advantage of using a pre-trained model (such as BERT) may be that it may be fine-tuned based on a smaller corpus of data. Methods such as question answering, and sentiment analysis may be used to fine tune the pre-trained model. In some cases, "transfer learning" may be used. Fine tuning may be a specific method of transfer learning, though it is noted that other transfer learning techniques may also be used. In some embodiments, security experts, with domain expertise in cybersecurity, may analyze threat intelligence textual reports and label them to fine tune the initial pre-trained model. In some embodiments, the pre-trained BERT model may provide sufficient prediction without the fine-tuning process. This labeling may then propagate through the machine learning process.

An example process of creating the corpus of data is given below, which may be performed in multiple ways. In some embodiments, creating the corpus of data may be manually performed by the security expert or automatically via auto parsing and search. In some examples, large language models may be used. For example, text markup may be used where the expert labels each section in the text (e.g. threat intelligence text) based on the attack states that the expert would like to include in the prediction model.

Examples of labeled text may be given as follows: Information from these <e1>scans<e1> may reveal opportunities for other forms of <e2>reconnaissance<e2> (ex: <e3>Search Open Websites/Domains<e3> or <e4>Search Open Technical Databases<e4>), <e5>establishing operational resources<e5> (ex: <e6>Develop Capabilities<e6> or <e7>Obtain Capabilities<e7>), and/or <e8>initial access<e8> (ex: <e9>External Remote Services<e9> or <e10>Exploit Public-Facing Application<e10>).

Each attack state may be bounded by the label $e_i$(defined as an entity) where i is a number from 1 to N (the number of potential entities). In the example above, the terms mirror the MITRE ATT&CK terminology. However, it should be noted that terms may not be limited to one specific language convention. Each text section that is being analyzed by the expert may be recorded with a text ID (e.g., txt_id=123456789).

Labels in one section of the text may be extended and may apply to some or all of the other sections with the same text. In some embodiments, the label may be extended (e.g., within a threshold) to sections with similar text strings. Similarity of text strings may be measured using various metrics such as earth mover distance. Three types of textual transition types may be defined as shown in table 200 shown in FIG. 2A (e.g. textual transition relationships between entities) where ID=1: represents a cause-and-effect (from→to) relationship in one direction, i.e., the order may be important, ID=2: entity A may be example of entity B, but B may not be an example of A, and ID=3: entity A may be example of entity B and B may be example of A.

Each text section, in this example section (e.g. txt_id 12345678), may be qualified in table 210 in FIG. 2B. Each entity labeled in the section may be recorded in the table including: the text section ID, the entities that were marked up within the text, e.g., e1, e2, . . . , each entity's corresponding ID, comment and notes which may be optional fields to describe the related attack state (entity) (e.g., the attack tactic, attack technique or attack sub-technique and note about the significance of the entity etc.).

Each directed and un-directed transition relations, that were recognized in the text section, may be recorded as shown in table 220 in FIG. 2C and table 230 in FIG. 2D as text transition relation qualifications which may include, the text section ID, the "FROM" and "TO" entities IDs, the relation type (e.g. 1, 2, or 3), and comments and notes which may be optional fields to describe the related entities transition.

Figure 2E:
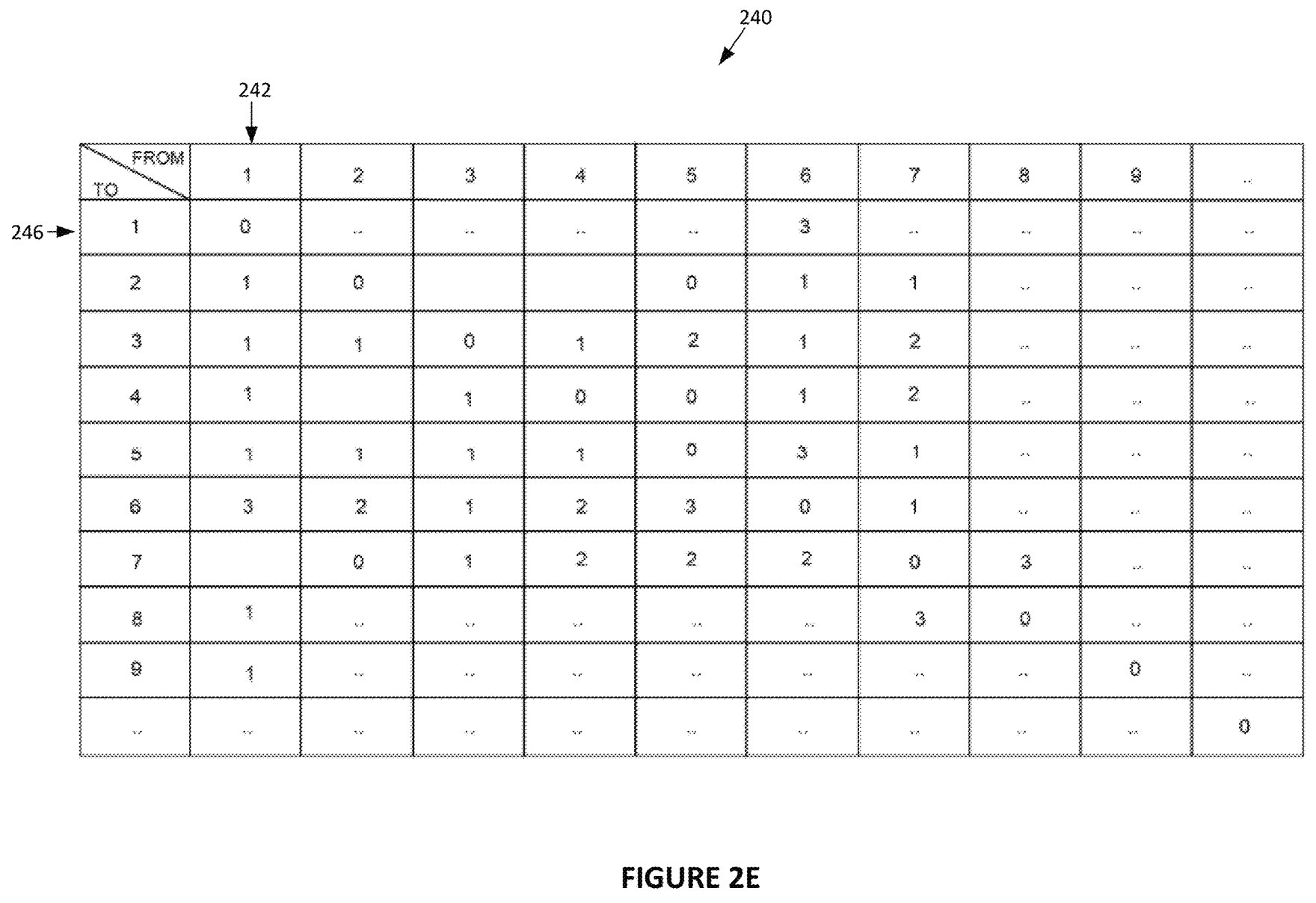

FIG. 2E depicts a relations matrix 240, according to example embodiments of the present disclosure. As shown, relations matrix 240 includes first column 242 and first row 246. Each section's results (e.g. recognized entity transition types) may be accumulated into a relation matrix where each column represents the $1^{st}$ entity ID, each row represents the $2^{nd}$ entity ID, and the number in each cell represents the number of times that transition of type 1 was recognized in the accumulated section. The relation matrix may be used as the final stage of the corpus data which may be used to fine tune the linguistic analysis model task such as the task of cyber relations transition (e.g. BERT layers may be added and defined as "feedforward neural network" for the "downstream task" of cyber transitions relation extraction). The output format of the ML NLP job that performs the linguistic analysis may be a simple entity pair transition type recognition that may be accumulated to a relation matrix. Furthermore, the relations matrix may define transition probabilities between attack events. This may be used to define the next events which may be likely to occur.

In some examples, the relations matrix may also be used to provide understanding of the event that may be occurring. For example, if there is a 0.75 probability of attack states which have the word escalation in the database, the present approach may provide an analyst with the estimation that they may be now in a privilege escalation stage. This may provide the analyst with context about the activity which may be occurring and enable insight into an adversary's actions. If multiple words appear with probability above a threshold, they may all be provided.

In some examples, the analyst then may choose one of the keywords based on their estimation of the activities by the adversary. This may be used to collapse the potential states in the graph to those states which include the keyword or similar words. Similar words may be defined based on lexicographic stemming, manual annotation or co-occurrence in attack states or attack history. Other methods may also be used. For example, in some embodiments, the system may use the output of the algorithm with analyst input to take action. Such action may include slowing down particular types of activities, preventing certain types of activities, raising new alerts, or any other type of action.

Figure 3:
FIG. 3 depicts a flow chart of a linguistic analysis procedure, according to example embodiments of the present disclosure.

FIG. 3 depicts a flow chart of a linguistic analysis procedure 300, according to example embodiments of the present disclosure.

At step 302, linguistic analysis module 110 of server system 104 may retrieve a threat intelligence text article automatically (e.g., through threat intel feeds, such as really simple syndication (RSS) feeds, spiders/web crawlers, or other methods of retrieving data). Alternatively, a user may manually retrieve the threat intel feeds. In one example, a search on the entity name may yield basic attack state as an initial search result. Name entity recognition may be performed by methods apparent to one of ordinary skill in the art. For example, at step 304, linguistic analysis module 110 may perform rule based parsing process that identifies entities name pairs, or their synonym defines a section. In one example, each combination of identified pairs of names may be truncated, leaving margins of X words before and after the names or based on specific stop text terms. The result may be a set of sections, each representing a different pair combination. Other methods of detecting sections may be used. At step 306, linguistic analysis module 110 may automatically mark up the identified entity names (i.e., attack step) which may be used where each marked-up section may be processed by the NLP ML process. Specifically, at step 308, linguistic analysis module 110 may define a test section for analysis per pair, while at step 310 linguistic analysis module 110 section may perform processing via ML. At step 312, linguistic analysis module 110 may then output pair relationships. In other words, the process output by linguistic analysis module 110 of server system 104 may be the identified relation type, (e.g., entity A followed by entity B, or entity B followed by entity A, where entity A may be an example of entity B, entity A may be in the same list of entity B). Other relation types may be of course possible.

In some embodiments, this matrix may represent the probabilities of cause-and-effect relationships between attack states (entities). These cause-and-effect relationships may be defined as "transitions" which may therefore be referred to as a "transition matrix". The transition matrix may be generated/updated based on a process that analyzes the outputs of the linguistic model predictions and security expert inputs. This will be further discussed in more detail below.

Attack steps may be represented through different threat description conventions. However, one of the more effective and popular conventions may be based on the MITRE ATT&CK terminology. This terminology defines attacks, tactics, techniques, sub-techniques and software. In general, a tactic may represent a more general attack intent, while techniques and sub techniques may represent more specific attack steps that serves the intent. Software might be used to describe the tool that enables the execution of a technique or a sub-technique, and thus might provide a more accurate context to the attack stage, (e.g., spear-phishing attachment sub-technique with a key logger software that provides better understanding of the attacker's intent than specifying the attack state only by a sub-technique which doesn't indicate what the attacker's intent may be and the possible next steps). Such a representation may teach that the intent may be to infect a user machine with a malicious software that may be used for personal data theft. Although the solution may not be limited to a specific attack state naming convention, this disclosure uses the MITRE ATT&CK terminology as an example in order to represent an attack state (an entity).

FIG. 4 depicts a transition matrix 400, according to example embodiments of the present disclosure. Transition matrix 400 includes first column 402 and first row 404. The column represents the "FROM" entity, the row represents the "TO" entity, and the value in each cell represents the transition conditional probability between the entities. The ID of each row and column may uniquely define the entity as follows: $1^{st}$ two digits represent the tactic, digits 3 and 4 represent the attack technique, digits 5 and 6 represents the attack sub-technique. For simplicity reasons, software type representation was excluded from the entity representation. It should be also noted that the transition matrix may allow for representation of bi-directional transitions, (i.e., from A to B and B to A). The transition matrix may also define an entity that includes only tactic (without technique and sub technique), or tactic and technique (without sub technique). For example: entity ID 050000 may represent only a tactic, and entity ID 051400 may represent an attack state by its tactic and technique. It also should be noted that that entity might be defined with more characterization parameters such as attack state role (victim or performer). The role may teach that if the defined entity refers to the victim or to the performer of the malicious attack step. This information might influence the transition probability. For example, and in the form of MITRE terminology, a "brute force" attack technique may be typically followed with a high probability by a "privilege escalation" attack technique if it refers to the same victim entity. The transition probability in this example may be lower if the transition represents a victim (to the $1^{st}$ attack state) that turns into a performer of the $2^{nd}$ attack state.

FIG. 5 depicts a process 500 for transition matrix generation, according to example embodiments of the present disclosure. In step 502, linguistic analysis module 110 outputs the linguistic analysis in the form of from-to attack entity transition per each textual section analysis. The linguistic analysis output may be either derived from the threat intelligence reports (using linguistic analysis) or may be defined manually by the security expert based on their domain expertise. At step 504, transition matrix module 114 may perform an aggregation process that accumulates all from-to entity transitions pairs and creates transition relation statistics which represents the number of recognized unique entity transitions, (e.g., count each from entity ID and to entity ID, while the numbers of entities may be from 1 to N, where N represents the number of attack states. The output format is shown in FIG. 2A. With reference to FIG. 2A, the transition probability calculation, and the aggregations may be performed on type 1 (e.g. transition type).

At steps 506 and 508, transition matrix module 114 may perform normalization and probability calculations. For example, at step 506, transition matrix module 114 may compute upper stats propagation, while at step 508, transition matrix module 114 may compute regulated conditional probabilities to compute the transition matrix. In one example, a pre-normalized matrix T(k,w) may be created, a 2-d array of size N×N. This matrix describes the number of from-to entity transitions per each from-to entity (k,w). So 'w' represents the from entity ID, and 'k' the to entity ID, and where k≠w (as entities repetitions may not be predicted) so by default when k=0, T(k,w)=0. This may be because typically the method may not learn entity repetition probabilities from the threat intelligence reports. Transition counting may also be performed automatically according to entities pair profile, (e.g., if entity 1 is an example of entity 3, then pair counters may be incremented accordingly in the transition count, i.e., entity 3 count will be incremented each time entity 1 was recognized). Transition types 2 and 3 may be used for this pair profiling. Upper entity propagation may involve propagating transition counters of sub-techniques to its parent technique, and techniques transition counters to their parent tactic.

As the relation matrix may include entities IDs that define tactic-only, and technique-only (e.g., 010000 defines tactic only, and 000100 defines technique only) these tactics and techniques transition counters may be adapted in the example as follows: adapt tactics-only counters based on type 1 transitions counters of their child techniques, and adapt techniques-only counters based on type 1 transition counters of their child sub-techniques.

This process may be an upper propagation of counters that creates an upper propagation matrix (UT). FIG. 6A depicts UT 600, where 602 is the first column and 604 is the first row, according to example embodiments of the present disclosure. With reference to FIG. 6A, row 2 represents technique-only "A", (e.g., phishing technique), whereas rows 5, 6, and 7 represent sub-techniques of technique "A", (e.g., spear-phishing attachment, spear-phishing link, spear-phishing via service). Adapting the transition counters of row 2 (technique A) in column 1, may be defined as summing all transition counters of sub techniques of "A" in column 1, and setting the technique counter of "A" as a maximum (sum of sub techniques counter, current counter). In the case above, the technique counter within the $1^{st}$ column may be set to 4. To complete the adaptation process, the same process may be repeated for each column in the relation matrix where adapting all techniques-only counters may be performed, and the whole process may be repeated again for tactics-only counters and their associated techniques. The results may be set for the final upper matrix of UT. A more formal definition of the upper propagation procedure may be given in Equation (1) below:

If $ID\_m$ is a parent node of $ID\_i1, ID\_i2, \ldots$
,$ID\_iM$, then $$UT(m,k)=\max(T(m,k),T(j\_i1)+T(j\_i2)+ \ldots +T(j\_iM)) \quad \text{Equation (1)}$$

Probability calculation and "regulated" probability approaches may include setting the layer of probabilities at the last stage in the creation of the transition matrix, which forms the result in Equation (2) below:

$$TrM=\{p(m,j)|1 \leq m,j \leq N\} \quad \text{Equation (2)}$$

Each p(m,j) for m≠j may be a probability of transition from entity ID_j to entity with ID_m. The columns of the matrix may be relevant to "from" entities, while the rows may be relevant to "to" entities. The probability of transition may be defined in Equation (3) below:

$$p(m,j)=0, \text{ where } m=j \quad \text{Equation (3)}$$

The matrix elements may be considered as a conditional probabilities p(ID_m|ID_j) to get entity D_m after ID_j. An example of a straightforward approach may be to set p(m,j) in Equation (4) below:

$$p(m, j) = \frac{T(m, j)}{\sum_{m=1}^{N} T(m, j)} \quad \text{Equation (4)}$$

The above probability calculation may be a more naïve conditional probability function. The approach may be relevant if a set of entities is exclusive and may not be possible after entity ID_j to go to both ID_m1 and ID_m1. Setting the final conditional probability of the transitions may be performed based on the final adapted matrix UT. Normalizers may be used where each entity belongs to one of the hierarchy layers (L), where L=1 represents tactics, L=2 represents techniques, and L=3 represents sub-techniques. For each column k of matrix UT(m,k) (connected with information from ID_k) and each level L of hierarchy define norm(L,k) which is a sum of elements UT(i,k) for i such that entity ID_i is a node of level L in the hierarchy. So, norm(L,k)=sum({UT(i,k) |level(Id_i)=L}). According to the definition, norm(L1,k)>norm(L2,k) if L1<L2 and norm(L1, k)>UT(i,k) if level(Id_i)=L1. So, norm(1,k) may be the largest from all normalizers.

In regulated conditional probability calculations, there may be some possible definitions of conditional probabilities. An example definition of conditional probabilities may be shown in Equation (5) below:

$$p(Id\_k|Id\_m)=UT(m,k)/\text{norm}(1,k) \quad \text{Equation (5)}$$

By using this method, low probabilities of transitions in certain cases may be observed. In order to provide a more effective method, a "regulated" probability calculation may be used as described below.

Configurable conditional probabilities depend on an additional parameter alpha, where 0<alpha<½. This may be defined in the system configuration and formula for conditional probability which may be different for different levels of target entity (i.e., to entity) such as in Equation 6 below:

For $ID\_m$ of level 1:

$$p(Id\_k|Id\_m)=UT(m,k)/\text{norm}(1,k)$$

For $ID\_m$ of level 2:

$$p(Id\_k|Id\_m)=UT(m,k)/((1-\text{alpha})*\text{norm}(2,k)+ \text{alpha}*\text{norm}(1,k))$$

For $ID\_m$ of level 3:

$$p(Id\_k|Id\_m)=UT(m,k)/((1-\text{alpha}-\text{alpha}^2)*\text{norm}(3, k)+\text{alpha}^2*\text{norm}(1,k)+\text{alpha}*\text{norm}(2,k))$$

Generic formula for level $L$:

$p(Id\_k|Id\_m)=UT(m,k)/\text{norm}(L,k,\text{alpha})$

Where $\text{norm}(L,k,\text{alpha})=(1-\text{norm}(L,k)*\text{sum}(\{\text{al-pha}^\hat{}ili=1,\ldots,L-1\}+\text{sum}(\text{norm}(i,k)\{\text{al-pha}^\hat{}ili=1,\ldots,L-1\}.$      Equation (6)

A reason for using the alpha and polynom functions in this example may be to increase the influence of higher-level entities such as sub-techniques elements. If these functions are not used, the probabilities of some of these elements may be too low.

In some embodiments, the probability model(s) may be generated and updated based on the transition matrix details. There may be a few prediction models that may be used separately, or combined, to generate predictions of attack states transitions. Each prediction model has its advantages and disadvantages. Therefore, it may be beneficial to create an ensemble multiple models that may allow increased prediction precision. For example, models may be combined using one or more techniques, such as boosting.

Figure 6B:
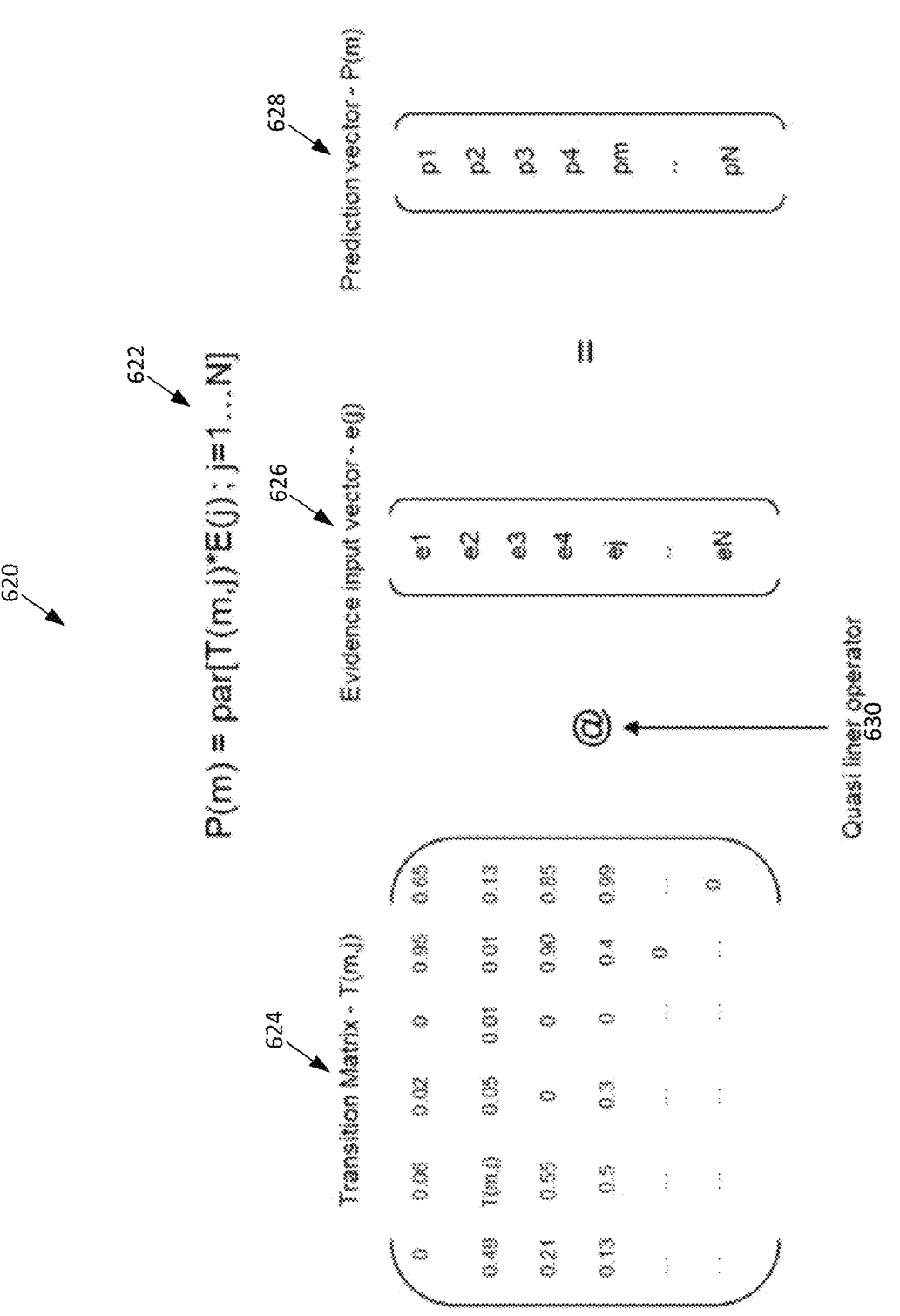
FIG. 6B depicts a quasi-linear prediction model, according to example embodiments of the present disclosure

FIG. 6B depicts a quasi-linear prediction model 620, according to example embodiments of the present disclosure. As shown, Equation 622 may be in matrix/vector form. Transition matrix 624 may be a matrix of the previously described entity transitions in FIG. 5, where each element in the transition matrix 624 may describe the probability of transition from a specific entity (j) to entity (m), such that each T(m,j) element may represent the transition probability. It is noted that J and m may be in the range of 1 . . . N, while N may be the number of all possible entities. Evidence input vector 626 'E' may include the set of the entities evidence (attack states). Each element 'e' may be assigned with a value between 0 to 1. A value of 1 may indicate that the entity exists, while a value of 0 may indicate that the entity doesn't exist. Any value between 0 to 1 may represent the level of probability (certainty) that the entity exists or does not exist. The sum of all probabilities may reach above 1 because there may be simultaneous attack states (e.g., both brute-force and spear phishing attachment threats techniques were discovered with high probability). This may be addressed by the "par" operator described below.

The quasi-linear operator 630 may multiply the input vector E(j) with each row in the matrix and sum the results in the form of the output prediction vector P(m) 628. The quasi operator 630 may normalize and sum the probabilities, so each output element may be in the range of 0 to 1.

The operation may be generally defined in Equation (7) below:

$$P(m) = par\sum\nolimits_{j=1}^{N}T(m,j)\times E(j)$$      Equation (7)

The par operator may be defined as a probability addition rule in Equation (8) below:

$P(A \text{ or } B)=P(A)+P(B)-P(A \text{ and } B)$      Equation (8)

Figure 7:
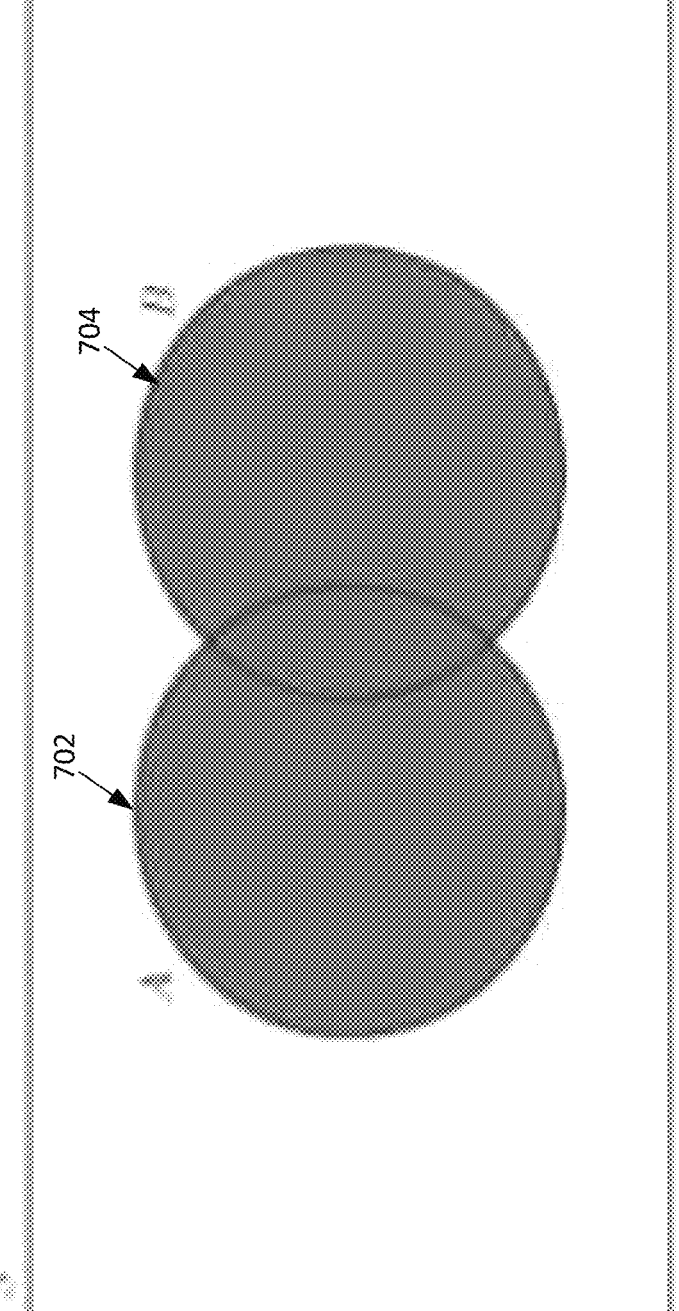
FIG. 7 depicts a probability addition rule, according to example embodiments of the present disclosure.

FIG. 7 depicts a probability addition rule 700, according to example embodiments of the present disclosure. The par has associative and commutative properties as illustrated by 702 and 704, and shown in Equation (9) below:

$A \text{ par } B=B \text{ par } A$ $(A \text{ par } B)\text{par } C=A \text{ par}(B \text{ par } C)$      Equation (9)

It is also should be noted that the par operator characteristics may be consistent with matrix decomposition and summation so that the following Equation (10) may be true:

$TrM\_1@a \text{ par } TrM\_2@a=(TrM\_1@+TrM\_2)@a$      Equation (10)

This property may be useful for cases where it may be more convenient to use subsets of the entire matrix and make the prediction on each one separately, (e.g., cases of multiple iterations in order to identify specific influence order etc.). Given the evidence inputs (Ej), the prediction vector P(m) (m=1 . . . N) describes the transition probability to each entity. In this example, the $1^{st}$ entry (p1) represents entity "brute force" technique where if the result probability value is 1, while all other entries may be set 0 (in p2 . . . pN), then the prediction of the following attack state entity may be a "brute force" attack technique, and no other prediction exist. The prediction vector in this case may be shown in Equation (11) below:

$$\begin{pmatrix} 1 \\ 0 \\ 0 \\ 0 \\ \ldots \\ \ldots \\ 0 \end{pmatrix}$$      (Equation 11)

The prediction input vector may include "fuzzy" evidence representation in the form of values between 0 and 1 which may be used to represent the level of certainty (probability) that each entity evidence really occurred. Use cases for using this fuzzy evidence is further described in the classification methods description. Advantages to the quasi-linear prediction model may be that the model is simple to construct and may include cyclic relationships, (i.e., the model may represent a situation that entity A may transit to entity B, and entity B may transit to entity A. In order to overcome some limitations, the quasi-linear model may be used repeatedly, by feeding the model iteratively with a different set of evidence so the prediction impact of each input may be analyzed separately.

Another effective option for prediction model may be a Bayesian Belief Network (BBN) prediction model based on BBN influence diagram that describes the conditional probabilities for transition between nodes in the Bayesian network where each node represents an entity (an attack state).

Figure 8:
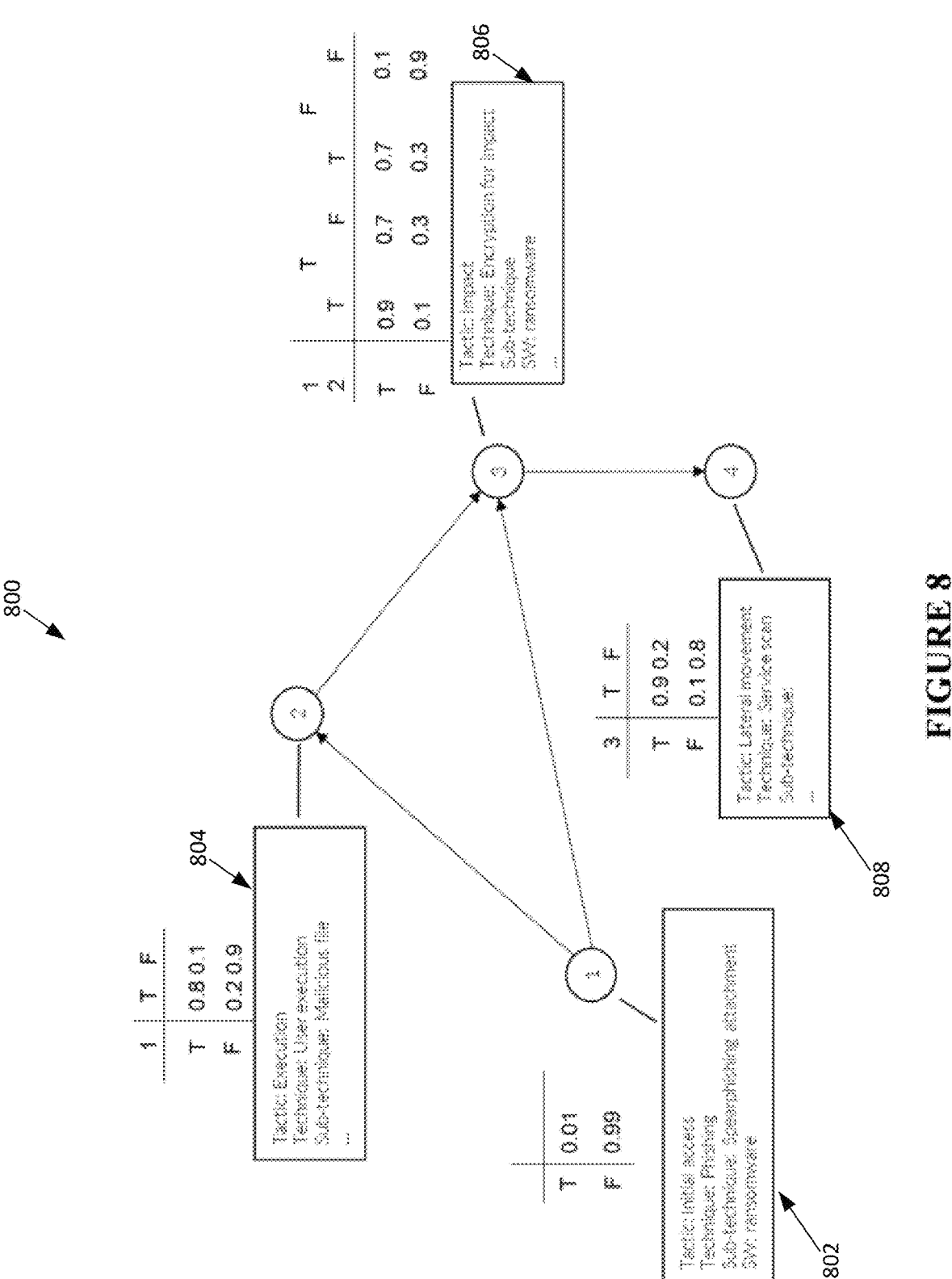
FIG. 8 depicts a BBN influence diagram, according to example embodiments of the present disclosure.

FIG. 8 depicts a BBN influence diagram 800, according to example embodiments of the present disclosure. Each node represents an entity, which in the above example may be represented by the MITRE tactic, technique, sub-technique and software class (SW). The edges may define the cause-and-effect direction (transition direction) between the entities. Each node may be assigned with a conditional probability table that describes the transition probability into it from all direct connected nodes. T may represent the probability of the occurrence of the entity, while F may represent the complementary probability (sum of T and F is 1). Once evidence is observed (e.g., a system detected the occurrence of an attack state), the BBN model may propagate the probabilities through the entire network. The conditional probability tables, tactics, techniques and sub-techniques are shown as 802, 804, 806 and 808.

Figure 9:
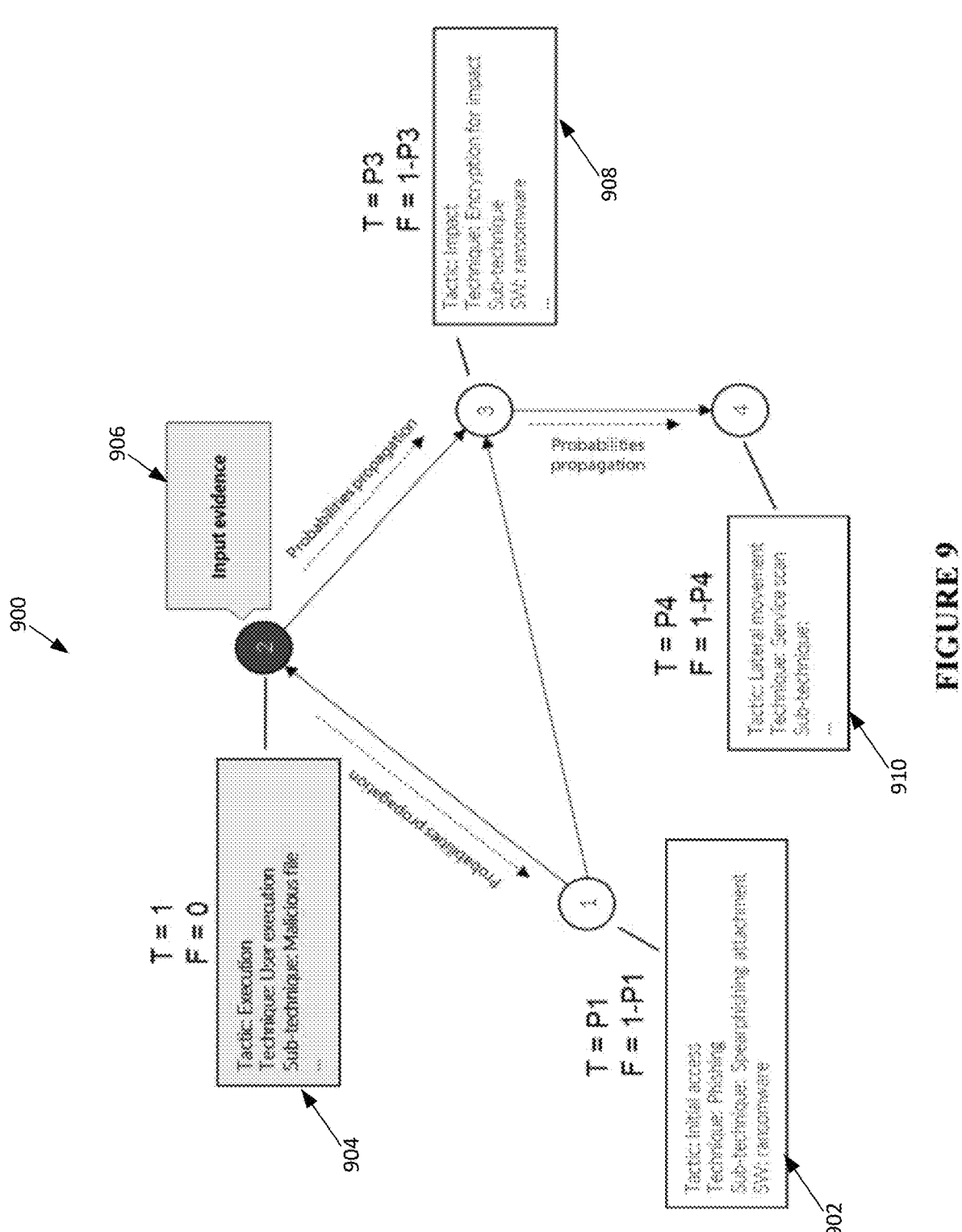
FIG. 9 depicts a probabilities propagation, according to example embodiments of the present disclosure.

For example, FIG. 9 depicts a probabilities propagation 900, according to example embodiments of the present disclosure. Node 2 may be the input evidence 906 with 100% certainty (True state=1; False state=0). Probability propagation may take place according to all conditional probability tables and may set the prediction probabilities for all other nodes accordingly. This may include nodes that may not be directly connected with the evidence node, (i.e., for a distance that is larger than 1 from the evidence node).

The conditional probability tables, tactics, techniques and sub-techniques are shown as 902, 904, 908 and 910.

Figure 10:
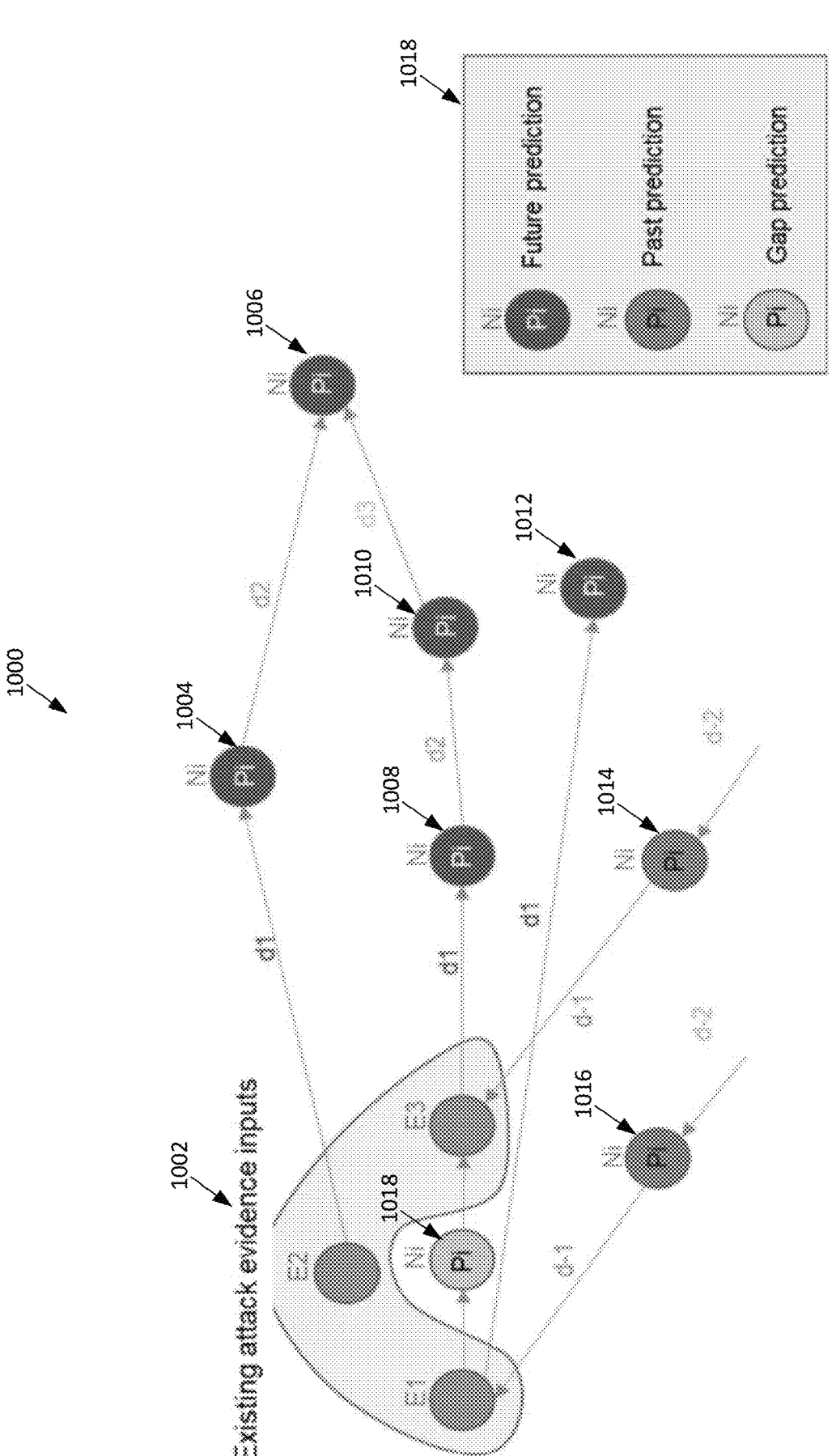
FIG. 10 depicts a BBN model advantages illustration, according to example embodiments of the present disclosure.

There are advantages to the quasi-linear prediction model. For example, FIG. 10 depicts a BBN model illustration 1000, according to example embodiments of the present disclosure. For example, the BBN model provides wide context of possible transitions including: past entities predictions (e.g. nodes 1014 and 1016); future entities predictions (nodes 1004, 1006, 1008, 1010, 1012); clear indication of the relationship between the entities (in case the input includes multiple evidence input); clear indication of the order of the predicted entities, (i.e., which attack state follows the other); providing "distance" (defines as 'd' in FIG. 10) analysis capabilities, (i.e., prediction per the distance from the evidence (parent) entity); and providing attack states "gap" predictions (node 1018). These may be prediction of attack state entities in between two existing evidence inputs (nodes 1002).

Figure 11:
FIG. 11 depicts a prediction models generation process, according to example embodiments of the present disclosure.

The overall process of generating the final prediction models is illustrated in FIG. 11 which depicts a prediction models generation process 1100, according to example embodiments of the present disclosure.

In order to create an influence diagram for BBN based model, and given that BBN model cannot include cyclic transitions, there may be a need to identify cyclic transitions cases and to decompose in step 1104 the transition matrix 1102 into a matrix that may include only non-cyclic transitions (for generating the BBN influence diagram), and another matrix that includes the remaining transitions. These steps may include computing a decomposition quality score in step 1106, selecting the best decomposition matrix in step 1108 and generating the BBN influence diagram in step 1110. In some embodiments, the values of the known or labeled nodes may be fixed and may not change during the calculation.

It is noted that in some embodiments, other methods for handling cyclic transitions, such as, but not limited to, loopy belief, propagation, Markov random fields, factor graphs or independent component analysis, can be used.

Figure 12:
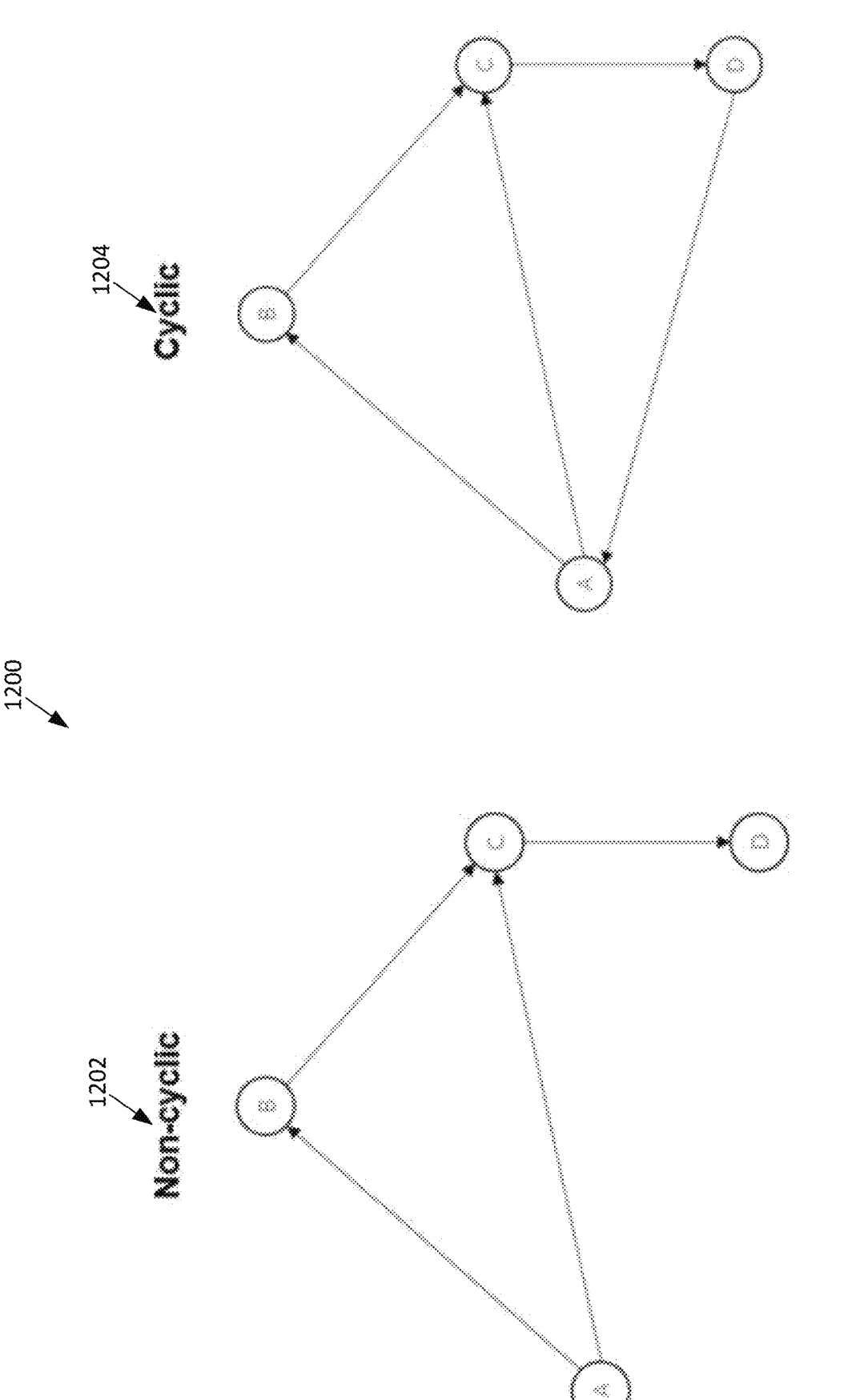
FIG. 12 depicts transitions cases, according to example embodiments of the present disclosure.

For example, in the decomposition method, 2 matrix types may be defined, which may be subset of the transition matrix (TrM), meaning that the sum of the matrices may be equal to the TrM. In this example, main matrix (Main_TrM) may include only non-cyclic transitions, while supplement (Sup_TrM) may include the cyclic transitions. In some embodiments low probability elements may be removed from the TrM so it may be less complex to create an effective influence diagram for the BBN prediction model. All excluded elements may join the supplement matrix Specifically, FIG. 12 depicts transitions cases 1200 with two transition types (cyclic and non-cyclic), according to example embodiments of the present disclosure. In the non-cyclic case 1202 on the left of FIG. 12, there may be no transition of entities that influence themselves, while in the cyclic case 1204 (on the right in FIG. 12), entity A may have influence on entity B and C, which influences on D and that influence back on A. Therefore, in this example, path A-B-C-D and path A-C-D are cyclic.

There may be a few decomposition methods that may be applied, and the overall goal may be to reach an optimized case so the size of the supplement matrix may be minimized while still containing all possible cyclic cases. One example of a decomposition method could be ordering which may be a method that organizes in sequence all entities so cyclic cases may be excluded (and kept in the supplement matrix). If entities may be organized in ordered sequence then the transition matrix for N entities may be represented as a 2D array TrM={T(i,j); 1<=i,j,<=N}, so TrM=TrM_Increasing+ TrM_Decreasing, where TrM_Increasing={T(i,j); 1<=i>j, <=N} ("From_ID" less than "To_ID") is the low triangular submatrix of TrM matrix, and where TrM_Decreasing={T (i,j); 1<=i<j,<=N}. ("To_ID" less then "From_ID") is the upper triangular submatrix of TrM matrix.

Figure 13:
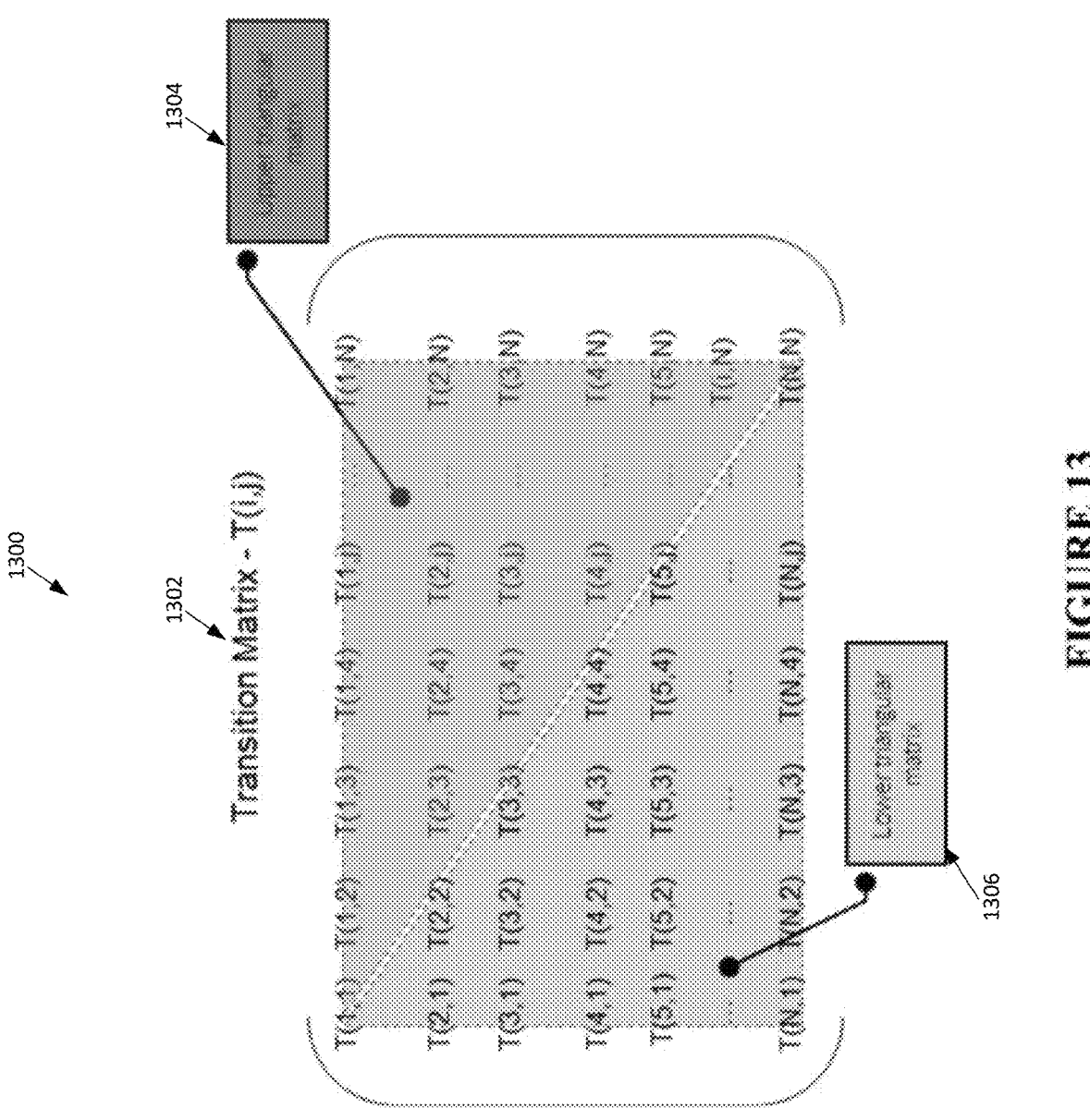
FIG. 13 depicts a simple ordering decomposition, according to example embodiments of the present disclosure.

The system may then choose the upper or lower diagonal (e.g. select diagonal with maximum non-zero elements) and set the selection as the main matrix. In that way it may be possible to exclude all possible cases that entity will eventually influence itself. FIG. 13 depicts a simple ordering decomposition 1300, according to example embodiments of the present disclosure. FIG. 13 shows an illustration of upper sub matrix 1304 and lower triangular sub matrix 1306 of transition matrix 1302.

Another method may be to define different orders of the elements by for example: selecting outgoing-only elements, (i.e., entities that only influence others, where outgoing-only indicates that that the element's row may be equal to zero); selecting the incoming-only elements that may be only influenced by others, where incoming-only indicates that the element's column may be equal to zero; setting the outgoing $1^{st}$ and then the incoming elements in the matrix, and then for all the rest defining another order.

For example, the method may include the following steps: assign each pair with the following four parameters that may take a value of 0 or 1 where the role order=0 if victim before performer, and role order=1 if the opposite is true; tactics order=0 indicates a "natural" order of tactics based on the MITRE order, (e.g., initial access is execution), and tactics order=1 if the opposite is true; hierarchy order=0 if the influence direction is from parent to child (e.g., tactic to technique . . . ), and hierarchy order=1 if the opposite is true; child order=0 if ID FROM is higher than ID TO such that all pairs may be equal according to previous rules. In this example, there may be $2^4$=16 variants from 0 up to 15, which may be indexed numbers in binary format. For example, 0110 indicates role order=0, tactics order=1, hierarchy order=1 and child order=0. The order of these pairs may be placed according to the binary value, and the lower or upper triangle matrix part may be again set based on the one that has higher number of non-zero elements.

Another trial-and-error type method may be to analyze the matrix and exclude "small cyclic" cases (e.g., $1^{st}$ order such as a->b, b->a), and continue to a $2^{nd}$ order cyclic behavior (e.g., a->b->c->a). Identifying the $1^{st}$ may be performed by analyzing the matrix and check each element and its opposite diagonal matrix. In the case where both are greater than zero, one may be excluded. For higher orders, the analysis may become more complex and would require more compute resource. In any case, once the process is complete and there is a main matrix candidate, an influence diagram may be created based on the candidate, and each path may be analyzed until stopped in a cyclic case and then dropped at that point on to the supplement matrix. It is noted that the above is an example of decomposition methods, and that other methods could be used.

Decomposition quality and selection criteria may be performed such that the best decomposition result is achieved (e.g. reach the maximal size of main matrix). Numerical estimation of the decomposition quality may be given by Equation (12) below:

$$\text{Quality score}=[TrM\_Main]/[TrM] \qquad \text{Equation (12)}$$

Where [ ] represents the sum of elements in the matrix

An influence diagram may be created based on the main matrix (for BBN), by using the par operation heuristics as shown in FIG. 8, where nodes are the entities enumerated by their IDs. ID_j where $1<=j<=N$, and each non zero probability (or higher than configurable probability threshold) entity of the main transition matrix p(m,k) defines an arrow from ID_k to ID_m.

Figure 14:
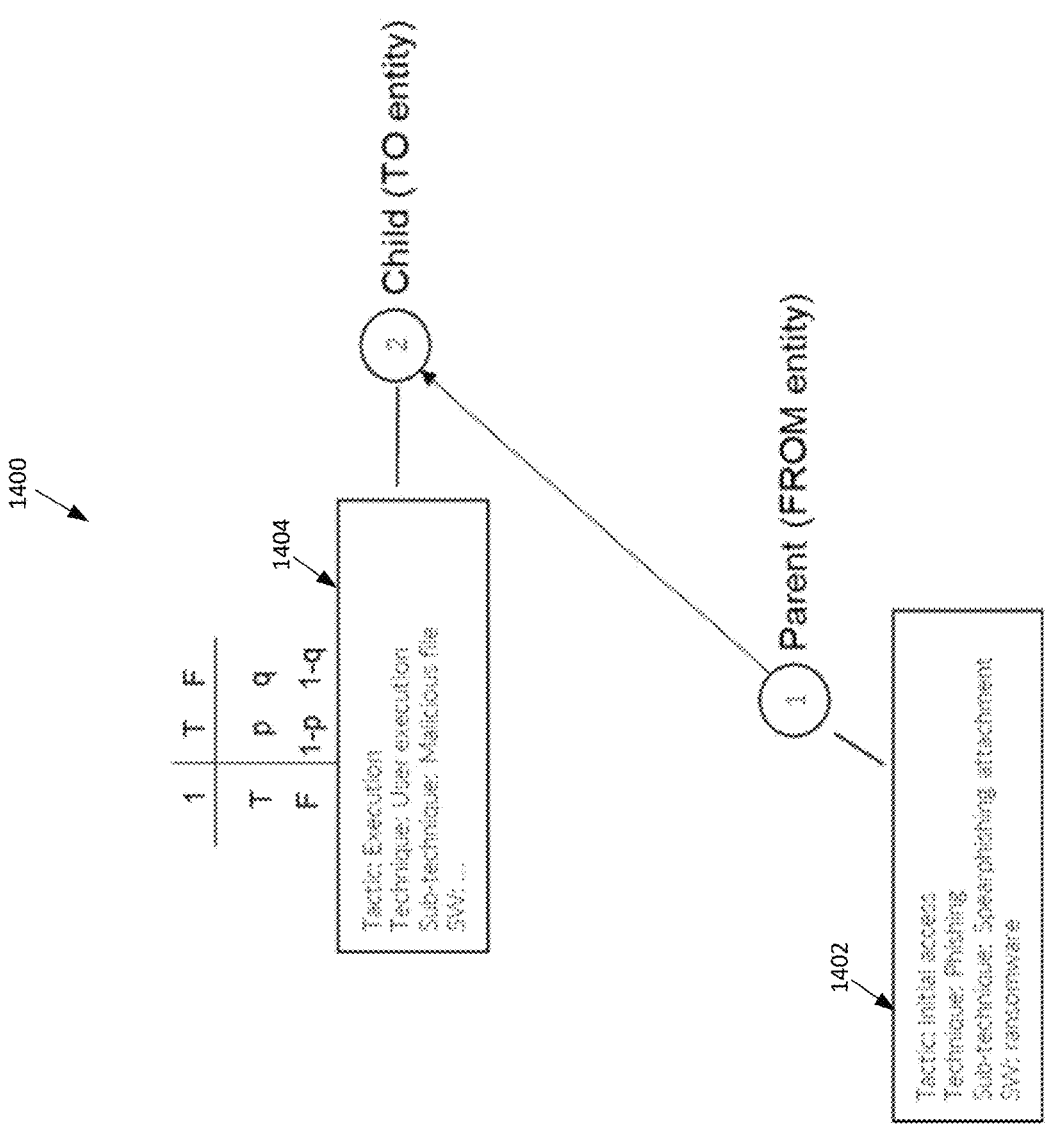
FIG. 14 depicts an influence diagram conditional probability table for a single influence node, according to example embodiments of the present disclosure.

FIG. 14 depicts an influence diagram conditional probability tables 1400 for a single influence node, according to example embodiments of the present disclosure. The probability tables, tactics, techniques, sub-techniques and software identity are shown as 1402 and 1404.

With reference to FIG. 14, p represents the probability of child 2 given that the parent entity 1 is true (T). This is the transition probability of main TrM(2,1). q represents the probability of child 2 given that the parent entity 1 is false (F). For each entity, q is defined a priori probability. q may be defined by expert as a part of their work, or it may be derived from transition matrix as a ratio of sum elements in the corresponding row, to sum of all matrix elements as show in Equation (13) below:

$$P\_default(EID)=sum(\{TrM(EID,j)|\text{all } j\})/sum(TrM(i,j)|\text{all } i,j);$$

$$q=P\_default \text{ if } p \text{ (taken from } TrM)<=P\_default, \text{otherwise } q=P\_default*P\_default/p \qquad \text{Equation (13)}$$

Figure 15:
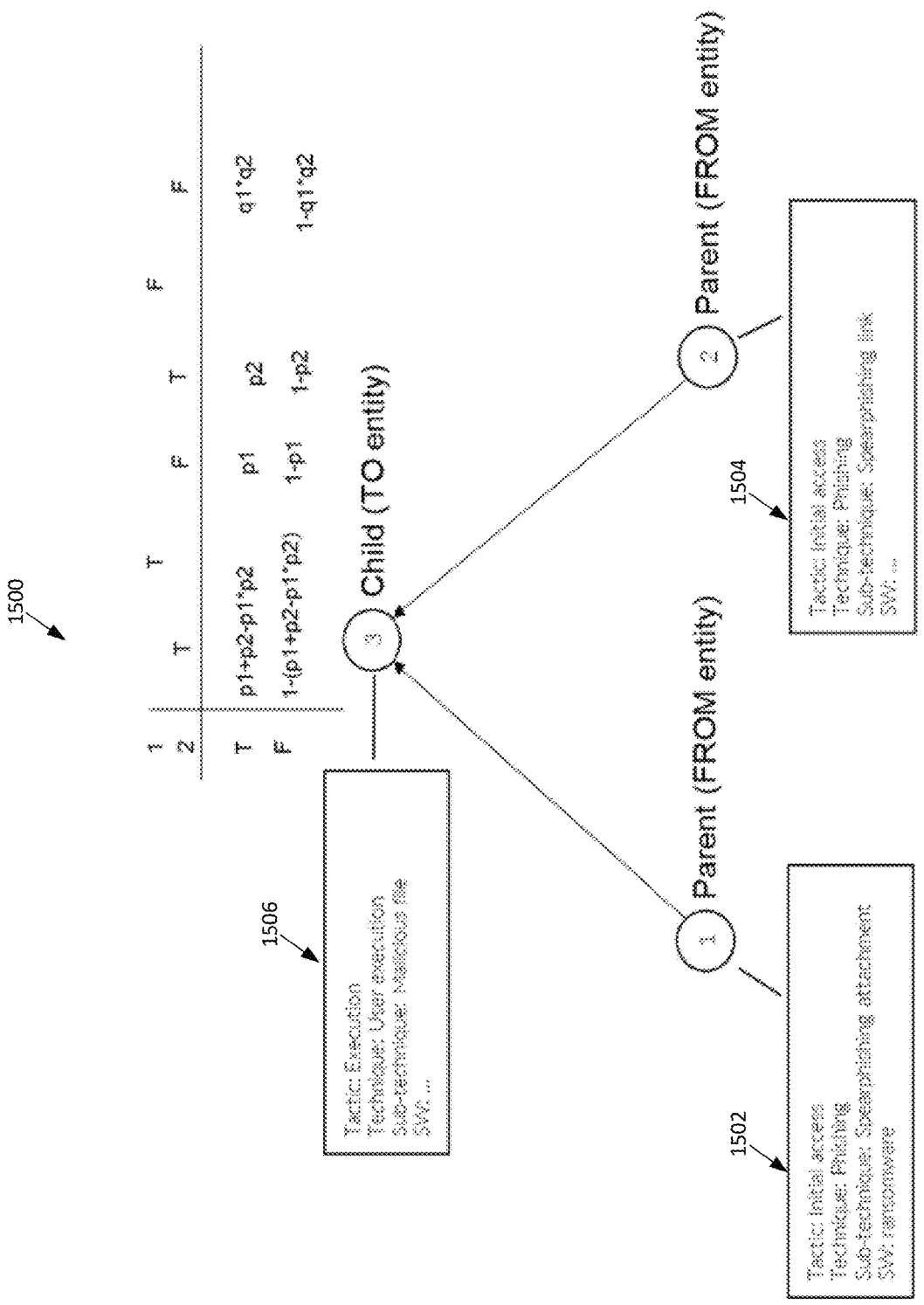
FIG. 15 depicts influence diagram conditional probability tables for multi-influence nodes, according to example embodiments of the present disclosure.

In case of multi-influence nodes a few approaches may be used. For example, an approach may be based on using probability addition rule and probability multiplication rule. The probability table of a node that may be influenced by 2 nodes is shown in FIG. 15. For example, FIG. 15 depicts influence diagram 1500 of conditional probability tables for multi-influence nodes, according to example embodiments of the present disclosure, where: $P(T|T,T)=p1+p2-p1*p2$; $P(F|T,T)=1-(p1+p2-p1*p2)$; $P(F|F,F)$ $(1-q1)+(1-q2)-(1-q1)*(1-q2)=1-q1*q2$; so $P(T|F,F)=q1*q2$; $P(T|T,F)=p1$; $P(F|T,F)=1-p1$; $P(T|F,T)=p2$; and $P(F|F,T)=1-p2$. The probability tables, tactics, techniques, sub-techniques and software identity are shown as 1502, 1504 and 1506. It is noted that if more than 2 parents need to be combined to the child, then the same process may be repeatedly applied.

Figure 16:
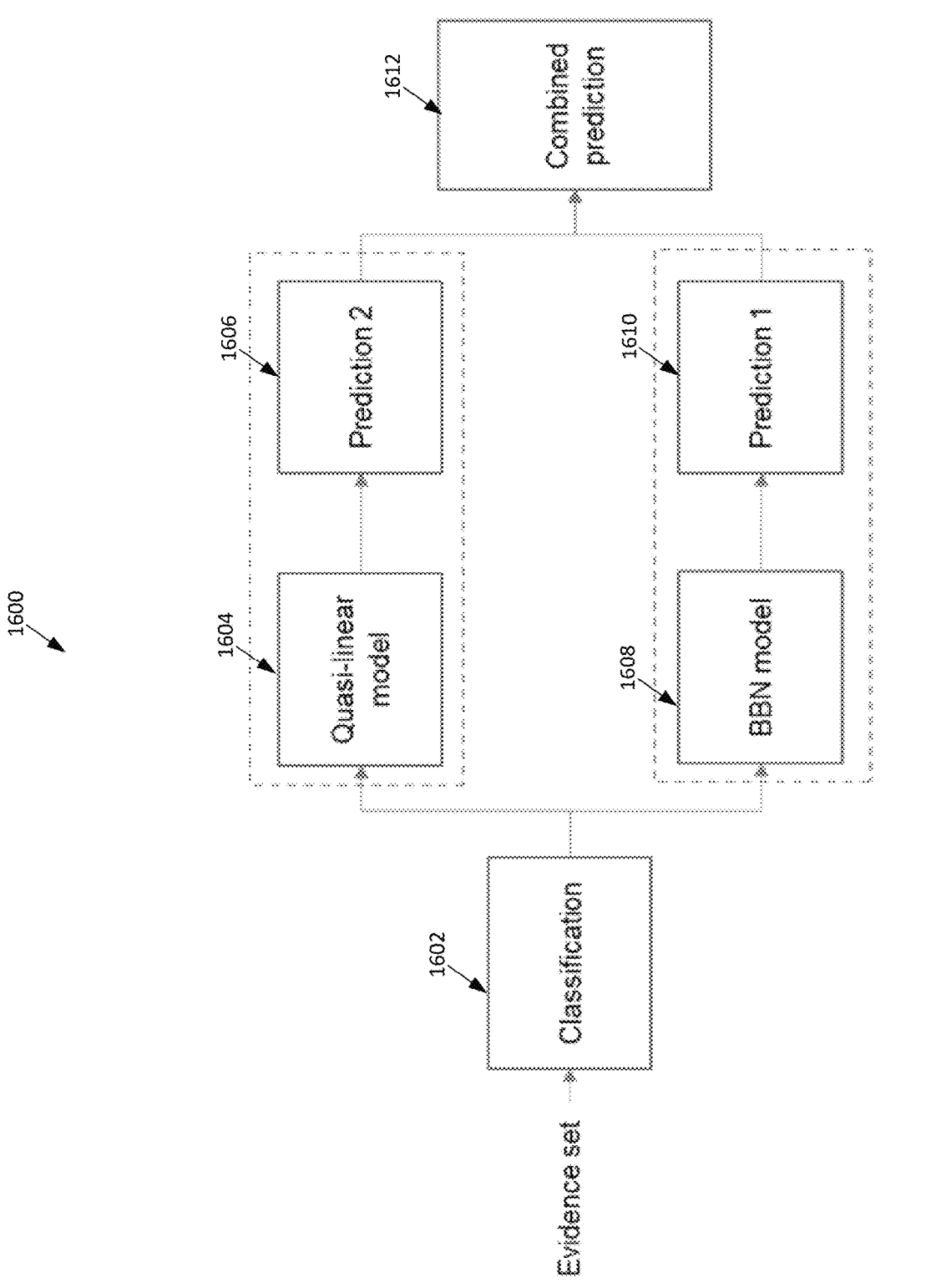
FIG. 16 depicts a predictive application and a combined prediction model, according to example embodiments of the present disclosure.

Based on the quasi-linear model and BBN models, the predictive application may predict entities transitions as shown in FIG. 16 which depicts flowchart 1600 of a predictive application and a combined prediction model, according to example embodiments of the present disclosure.

Run time prediction flow may be implemented such that once prediction models are defined, the run time prediction operation of the system performs the following steps. Evidence set may be composed from logs that may be collected from security tools, network devices, identity management systems, cloud workspace applications, endpoint OS and others. Collected logs may be classified in step 1602 into recognized attack states (entities) which serve as the input entities vector for both prediction models. Classification methods may include the BBN model 1608 which generates prediction 1610 (prediction 1) based on the automatically generated influence diagram (from main TrM) and the BBN probability propagation process. With reference to the BBN prediction model description and in FIG. 10, the predictive application may apply further filtering steps including (but not limited to): filtering out predictions based on probability thresholds; filtering out predictions based on distance threshold; and filtering out predictions based on the prediction type, e.g., future, past, gap etc.

The quasi-linear model 1604 generates prediction 1606 (prediction 2) based on the supplement TrM. The predictive application may apply prediction iterations in order to provide better context. The predictive application may filter out prediction elements that may be below a predefined probability. A combined prediction 1612 may be realized in different ways. For example: comparing both results predictions and future predictions that may not be included in prediction 1 (in the BBN model); and comparing both results and weighted average the probability of common predicted elements (this may be done before filtering elements based on probability thresholds.

Classification methods may classify logs collected from $3^{rd}$ party systems into a set of entities that represent them in the language of the prediction models (i.e., attack states based for example on MITRE ATT&CK terminology). For example, in a heuristic rules solution, expert rules may parse and extract the relevant log fields and map the values within these fields to specific entities (i.e., MITRE attack states). For example, an intrusion detection system (IDS) alert log that includes a threat category field that includes, for example, "Brute force" value may be automatically mapped to "Brute force" attack technique entity, whereas alerts that includes a threat category field value of "Network probe" may be automatically mapped to "Network service scan" attack technique entity, etc. These rules may be typically created and maintained by the security experts, and may be customized by the end user as well. In some embodiments, this may be performed by using a metric in the language space or by correlation with attacks and comments or annotations made by responders to an attack. End user input methods allow the end user to view the collected logs and provide classification input per each one in the form of MITRE ATT&CK entity name, such as phishing attachment, phishing via service etc. AI ML classification methods may include an NLP trained model that analyze intelligence threat report that may be associated with IOC's extracted from the logs such as file hash, malware name, attack signature ID and more, and classify the log into potential entity name. A fuzzy classification system may be yet another method of log classification based on a triage process. Given that a log with known classification is being collected (e.g., was classified as "brute force"—define as "classified log"), the system may classify other "non-classified" logs according to the classification if one or more of the following rules are met: The time stamp of the logs falls within a certain configurable, or automatically adapted time window; The identity of the target machine or user account, or email account is the same as of the classified log; The source identity of the machine or user account, or email account is the same as for the classified log. Of course, other methods of correlation known to one skilled in the art could be used.

According to these rules, the system may classify logs into specific entities names that represent the MITRE threat as well as assign each classification with a weight that reflects the classification level of certainty, hence providing the definition of "fuzzy" classification.

The above methods may classify the entities in order to generate the prediction input vector as described with respect to the prediction models above.

It should be noted that BERT may include many "BERTs" which differ in resources (size), architecture and linguistic base such as SciBERT (BERT trained on scientific text), BioBERT (BERT trained on biomedical text), etc. An example of linguistics analysis may be given using BERT but there may be other algorithms such as pretrained language model (PLM) that may be fine tuned for relation extraction downstream tasks.

FIG. 17 illustrates an architecture of system bus computing system 1700 of one or more of the computer devices (e.g. server system 104, database 108, system under threat 122 and user device 124) shown in FIG. 1A, according to example embodiments of the present disclosure. One or more components of system 1700 may be in electrical communication with each other using a bus 1705. System 1700 may include a processor (e.g., one or more CPUs, GPUs or other types of processors) 1710 and a system bus 1705 that couples various system components including the system memory 1715, such as read only memory (ROM) 1720 and random-access memory (RAM) 1725, to processor 1710. System 1700 may include a cache of high-speed memory connected directly with, in close proximity to, or integrated as part of processor 1710. System 1700 may copy data from memory 1715 and/or storage device 1730 to cache 1712 for quick access by processor 1710. In this way, cache 1712 may provide a performance boost that avoids processor 1710 delays while waiting for data. These and other modules may control or be configured to control processor 1710 to perform various actions. Other system memory 1715 may be available for use as well. Memory 1715 may include multiple different types of memory with different performance characteristics. Processor 1710 may be representative of a single processor or multiple processors. Processor 1710 may include one or more of a general purpose processor or a hardware module or software module, such as service 1 1732, service 2 1734, and service 3 1736 stored in storage device 1730, configured to control processor 1710, as well as a special-purpose processor where software instructions may be incorporated into the actual processor design. Processor 1710 may essentially be a completely self-contained computing system, containing multiple cores or processors, a bus, memory controller, cache, etc. A multi-core processor may be symmetric or asymmetric.

To enable user interaction with the system 1700, an input device 1745 may be any number of input mechanisms, such as a microphone for speech, a touch-sensitive screen for gesture or graphical input, keyboard, mouse, motion input, speech and so forth. An output device 1735 (e.g., a display) may also be one or more of a number of output mechanisms known to those of skill in the art. In some embodiments, multimodal systems may enable a user to provide multiple types of input to communicate with system 1700. Communication interface 1740 may generally govern and manage the user input and system output. There is no restriction on operating on any particular hardware arrangement and therefore the basic features here may easily be substituted for improved hardware or firmware arrangements as they are developed.

Storage device 1730 may be a non-volatile memory and may be a hard disk or other type of non-transitory computer readable media that may store data that are accessible by a computer, such as magnetic cassettes, flash memory cards, solid state memory devices, digital versatile disks, cartridges, random access memories (RAMs) 1725, read only memory (ROM) 1720, and hybrids thereof.

Storage device 1730 may include services 1732, 1734, and 1736 for controlling the processor 1710. Other hardware or software modules are contemplated. Storage device 1730 may be connected to system bus 1705. In one aspect, a hardware module that performs a particular function may include the software component stored in a computer-readable medium in connection with the necessary hardware components, such as processor 1710, bus 1705, output device 1735 (e.g., a display), and so forth, to carry out the function.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The computer system includes one or more processor(s) for executing computer program(s) stored on the program product.

The program(s) of the program product define functions of the embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method for predicting a future stage of an attack on a computer system, comprising:

performing, by the computer system, linguistic analysis on threat intelligence reports, the threat intelligence reports comprising known stages of the attack;

processing, by the computer system, the linguistic analysis with a transition matrix that represents probabilities of transitions between multiple attack stages to determine probabilities of cause-and-effect relationships between the known stages of the attack;

updating, by the computer system, a probability model based on the probabilities determined by the transition matrix using new threat intelligence data processed through the transition matrix; and predicting, by the computer system, a probabilistic sequence of multiple future stages in the attack based on the probability model and a plurality of attack classifications.

2. The method of claim 1, further comprising:

choosing, by the computer system, the probability model from a plurality of probability models.

3. The method of claim 1, further comprising:

setting, by the computer system, the plurality of attack classifications based on an evidence data set including logs that are collected from at least one of security tools, network devices, identity management systems, cloud workspace applications, and endpoint operating system.

4. The method of claim 1, further comprising:

performing, by the computer system, the linguistic analysis initially using a pre-trained natural language processing (NLP) model configured to predict missing textual terms.

5. The method of claim 4, further comprising:

performing, by the computer system, the NLP model using a Bidirectional Encoder Representations from Transformers (BERT) Machine Learning algorithm for creating NLP predictive models based on textual data in an unsupervised manner.

6. The method of claim 1, further comprising:

predicting, by the computer system, the future stage in the attack based on a plurality of probability models and combining the predictions from the plurality of probability models as a combined prediction of the future stage in the attack.

7. The method of claim 6, wherein the plurality of probability models includes a Quasi-Linear prediction model and a Bayesian Belief Network prediction model.

8. The method of claim 1, further comprising:

predicting, by the computer system, the future stage in the attack by specifying at least one of attack tactics, attack techniques, attack sub-techniques and attack software identity.

9. The method of claim 1, further comprising:

generating, by the computer system, the probability model by:

performing matrix decomposition of the transition matrix using a plurality of matrix decomposition methods, scoring the decomposition for each of the plurality of matrix decomposition methods, selecting one of the matrix decompositions based on the scoring, and generating the probability model using the selected one of the matrix decompositions.

10. The method of claim 9, further comprising:

performing, by the computer system, the matrix decomposition as a main matrix including non-cyclic transitions of the known stages of the attack and supplement matrix including cyclic transitions of the known stages of the attack.

11. A non-transitory computer readable medium comprising one or more sequences of instructions, which, when executed by a processor, causes a computer system to predict a future stage of an attack on another computer system by performing operations comprising:

performing, by the computer system, linguistic analysis on threat intelligence reports, the threat intelligence reports comprising known stages of the attack;

processing, by the computer system, the linguistic analysis with a transition matrix that represents probabilities of transitions between multiple attack stages to determine probabilities of cause-and-effect relationships between the known stages of the attack;

updating, by the computer system, a probability model based on the probabilities determined by the transition matrix using new threat intelligence data processed through the transition matrix; and predicting, by the computer system, a probabilistic sequence of multiple future stages in the attack based on the probability model and a plurality of attack classifications.

12. The non-transitory computer readable medium of claim 11, further comprising:

choosing, by the computer system, the probability model from a plurality of probability models.

13. The non-transitory computer readable medium of claim 11, further comprising:

setting, by the computer system, the plurality of attack classifications based on an evidence data set including logs that are collected from at least one of security tools, network devices, identity management systems, cloud workspace applications, and endpoint operating system.

14. The non-transitory computer readable medium of claim 11, further comprising:

performing, by the computer system, the linguistic analysis initially using a pre-trained natural language processing (NLP) model configured to predict missing textual terms.

15. The non-transitory computer readable medium of claim 14, further comprising:

performing, by the computer system, the NLP model using a Bidirectional Encoder Representations from Transformers (BERT) Machine Learning algorithm for creating NLP predictive models based on textual data in an unsupervised manner.

16. The non-transitory computer readable medium of claim 11, further comprising:

predicting, by the computer system, the future stage in the attack based on a plurality of probability models and combining the predictions from the plurality of probability models as a combined prediction of the future stage in the attack.

17. The non-transitory computer readable medium of claim 16, wherein the plurality of probability models includes a Quasi-Linear prediction model and a Bayesian Belief Network prediction model.

18. The non-transitory computer readable medium of claim 11, further comprising:

predicting, by the computer system, the future stage in the attack by specifying at least one of attack tactics, attack techniques, attack sub-techniques and attack software identity.

19. The non-transitory computer readable medium of claim 11, further comprising:

generating, by the computer system, the probability model by:

performing matrix decomposition of the transition matrix using a plurality of matrix decomposition methods, scoring the decomposition for each of the plurality of matrix decomposition methods, selecting one of the matrix decompositions based on the scoring, and generating the probability model using the selected one of the matrix decompositions.

20. The non-transitory computer readable medium of claim 19, further comprising:

performing, by the computer system, the matrix decomposition as a main matrix including non-cyclic transitions of the known stages of the attack and supplement matrix including cyclic transitions of the known stages of the attack.

* * * * *